(12) United States Patent
Tabata et al.

(10) Patent No.: US 8,552,684 B2
(45) Date of Patent: *Oct. 8, 2013

(54) NON-CONTACT CHARGING MODULE AND RECEPTION-SIDE AND TRANSMISSION-SIDE NON-CONTACT CHARGING APPARATUSES USING THE SAME

(75) Inventors: Kenichiro Tabata, Miyazaki (JP); Tokuji Nishino, Miyazaki (JP); Akio Hidaka, Miyazaki (JP); Naoyuki Kobayashi, Miyazaki (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/355,796

(22) Filed: Jan. 23, 2012

(65) Prior Publication Data
US 2012/0187903 A1  Jul. 26, 2012

(30) Foreign Application Priority Data

Jan. 26, 2011 (JP) .................... 2011-013618
Feb. 24, 2011 (JP) .................... 2011-038064
Jun. 14, 2011 (JP) .................... 2011-131949
Jun. 14, 2011 (JP) .................... 2011-131950
Jun. 20, 2011 (JP) .................... 2011-135947

(51) Int. Cl.
*H02J 7/02* (2006.01)
*H02J 7/00* (2006.01)

(52) U.S. Cl.
USPC ............................ 320/108; 320/109; 320/139

(58) Field of Classification Search
USPC ........................................... 320/108
See application file for complete search history.

(56) References Cited

U.S. PATENT DOCUMENTS

| | | | | |
|---|---|---|---|---|
| 6,175,212 B1 * | 1/2001 | Oguri | ............................ | 320/108 |
| 6,396,241 B1 * | 5/2002 | Ramos et al. | .................. | 320/108 |
| 6,803,744 B1 * | 10/2004 | Sabo | ............................ | 320/108 |
| 7,042,196 B2 * | 5/2006 | Ka-Lai et al. | .................. | 320/108 |

(Continued)

FOREIGN PATENT DOCUMENTS

| | | |
|---|---|---|
| EP | 2535906 A1 | 12/2012 |
| JP | 2006-042519 A | 2/2006 |

(Continued)

OTHER PUBLICATIONS

International Search Report for PCT/JP2011/007348 dated Apr. 10, 2012.

(Continued)

*Primary Examiner* — Yalkew Fantu
(74) *Attorney, Agent, or Firm* — Pearne & Gordon LLP

(57) ABSTRACT

It is an object to provide a non-contact charging module that prevents the magnet from negatively influencing particularly the inside portion of a coil and improves power transmission efficiency, even when a magnet is used for alignment. This non-contact charging module is a reception-side non-contact charging module, to which power is transmitted from a transmission-side non-contact charging module which is equipped with magnet, by electromagnetic induction, in which the non-contact charging module includes a planar coil portion around which spiral electric lines are wound, and a magnetic sheet disposed to face the surface of coil of the planar coil portion so that it faces the magnet of the transmission-side contact module, in which the inner diameter of the planar coil portion is larger than the magnet.

31 Claims, 13 Drawing Sheets

(56) References Cited

U.S. PATENT DOCUMENTS

| | | | |
|---|---|---|---|
| 7,271,569 B2* | 9/2007 | Oglesbee | 320/108 |
| 7,917,086 B2 | 3/2011 | Kondo et al. | |
| 2005/0116683 A1* | 6/2005 | Cheng et al. | 320/108 |
| 2008/0111518 A1* | 5/2008 | Toya | 320/108 |
| 2008/0122570 A1 | 5/2008 | Takaishi | |
| 2009/0001932 A1* | 1/2009 | Kamijo et al. | 320/108 |
| 2009/0096413 A1* | 4/2009 | Partovi et al. | 320/108 |
| 2009/0284341 A1 | 11/2009 | Okada et al. | |
| 2010/0156345 A1 | 6/2010 | Phelps, III | |

FOREIGN PATENT DOCUMENTS

| | | |
|---|---|---|
| JP | 2008-135589 A | 6/2008 |
| JP | 2008-206234 A | 9/2008 |
| JP | 2008-210861 A | 9/2008 |
| JP | 2009-159660 A | 7/2009 |
| JP | 2009-277820 A | 11/2009 |
| JP | 2010-284059 A | 12/2010 |
| JP | 2011-013618 A | 1/2011 |
| JP | 4835795 B1 | 10/2011 |
| WO | 2009-105615 A2 | 8/2009 |
| WO | 2009/114671 A1 | 9/2009 |

OTHER PUBLICATIONS

System Description Wireless Power Transfer, Oct. 2010, Part 1: Interface Definition, Version 1.0.1 vol. I.

Extended European Search Report for Application No. 11856873.2-1556/2546844 dated Mar. 11, 2003.

"System Description Wireless Power Transfer", Internet Citation, Oct. 1, 2010, pp. 1-76, XP008158253.

Japanese Office Action for Application No. 2012-017681 dated Aug. 7, 2013.

* cited by examiner

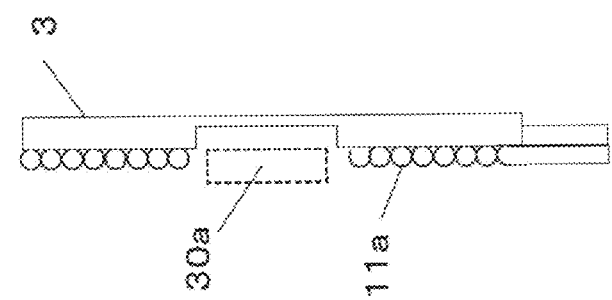
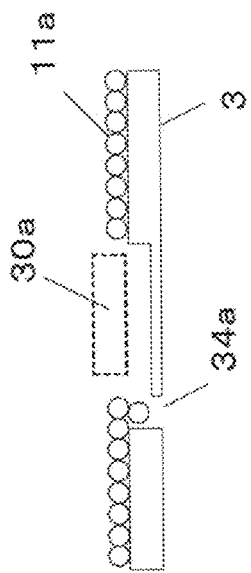
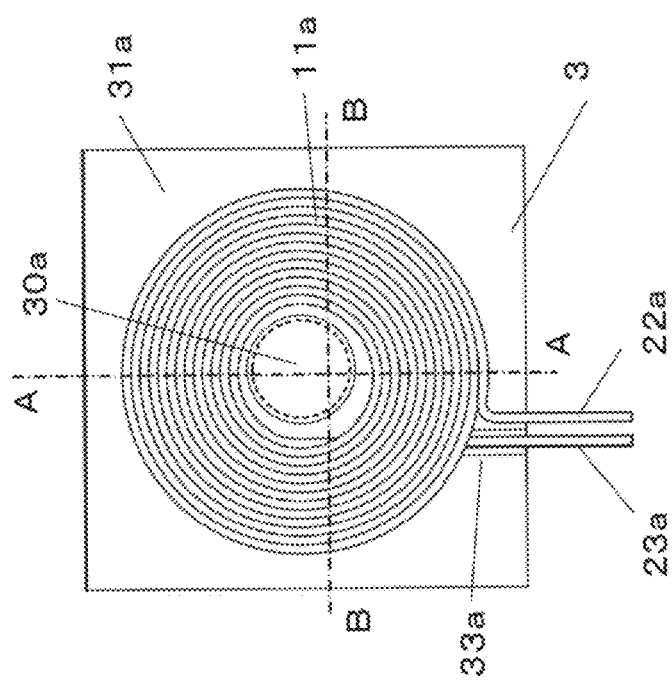
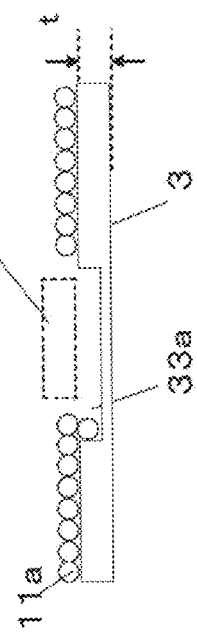

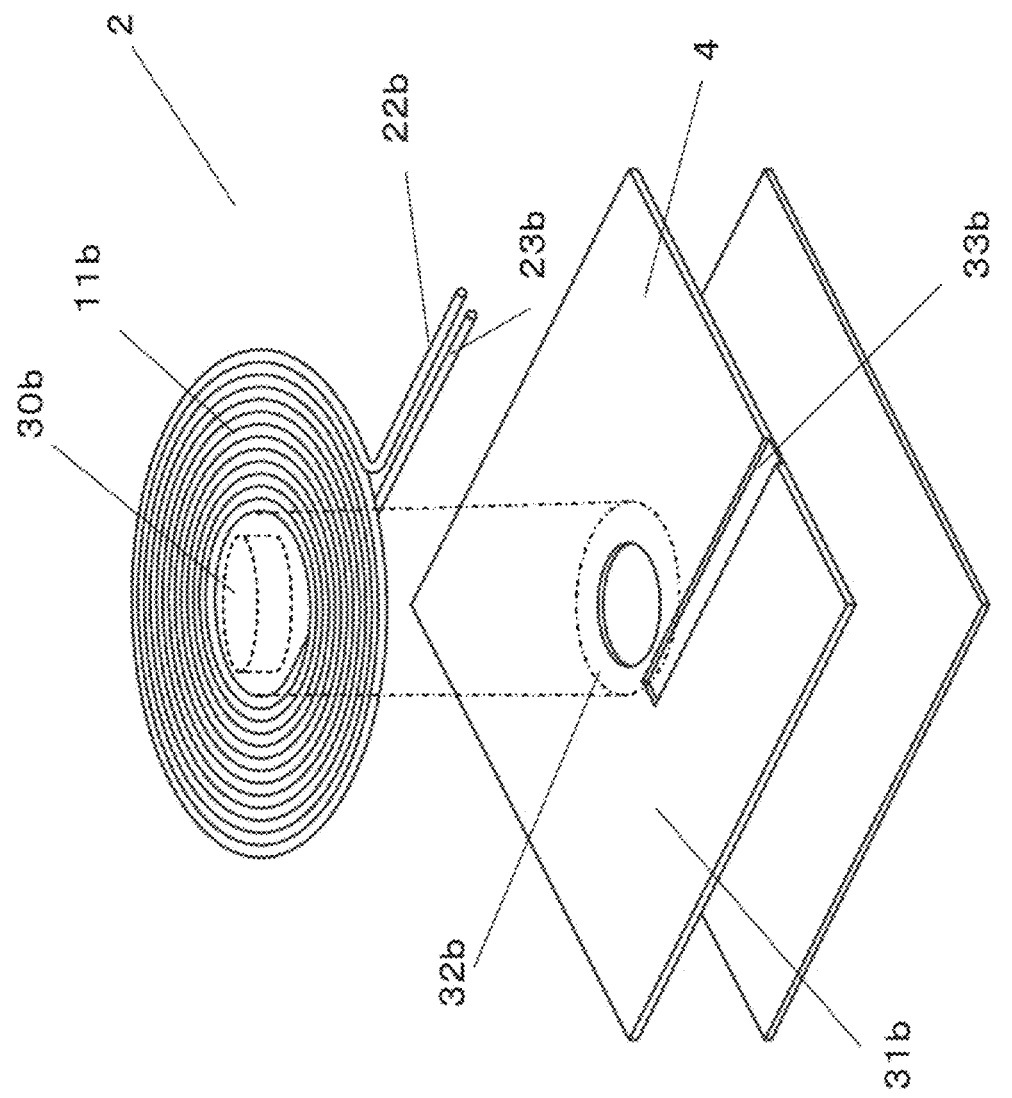

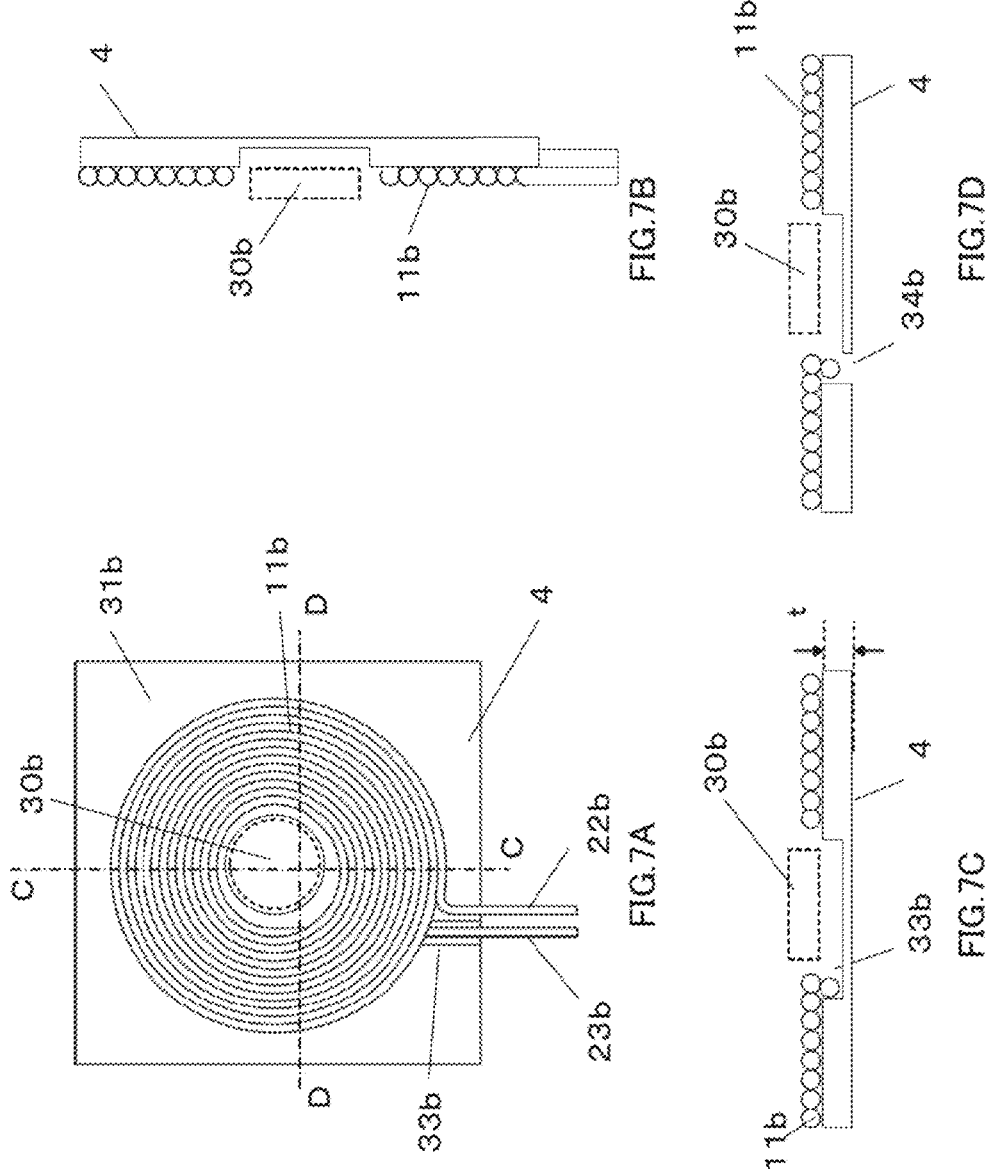

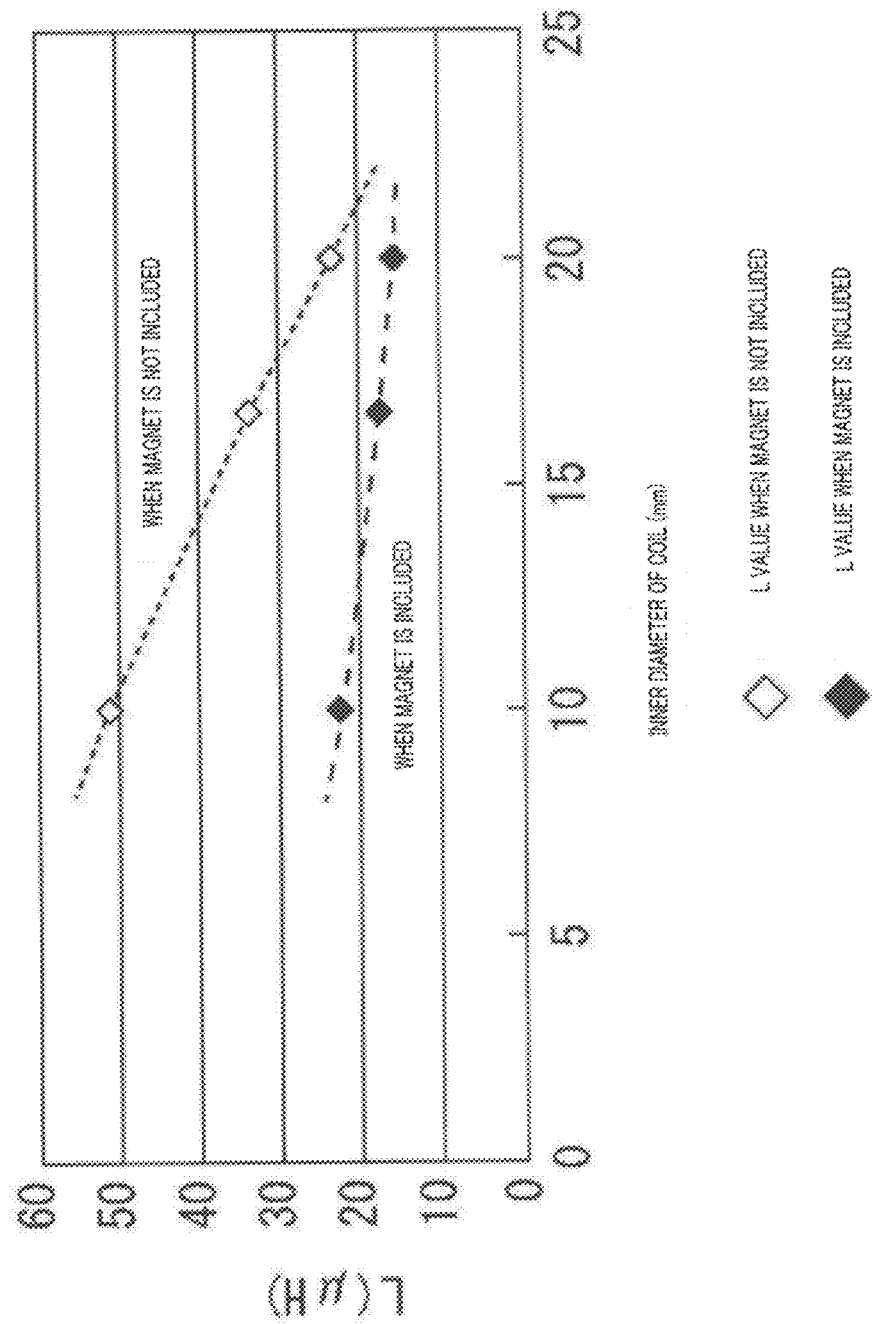

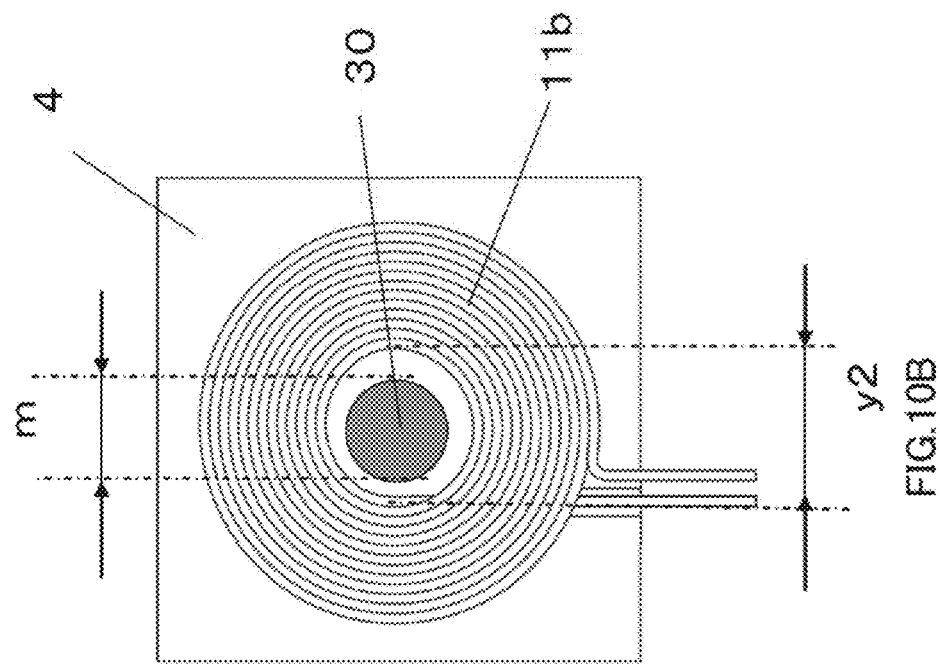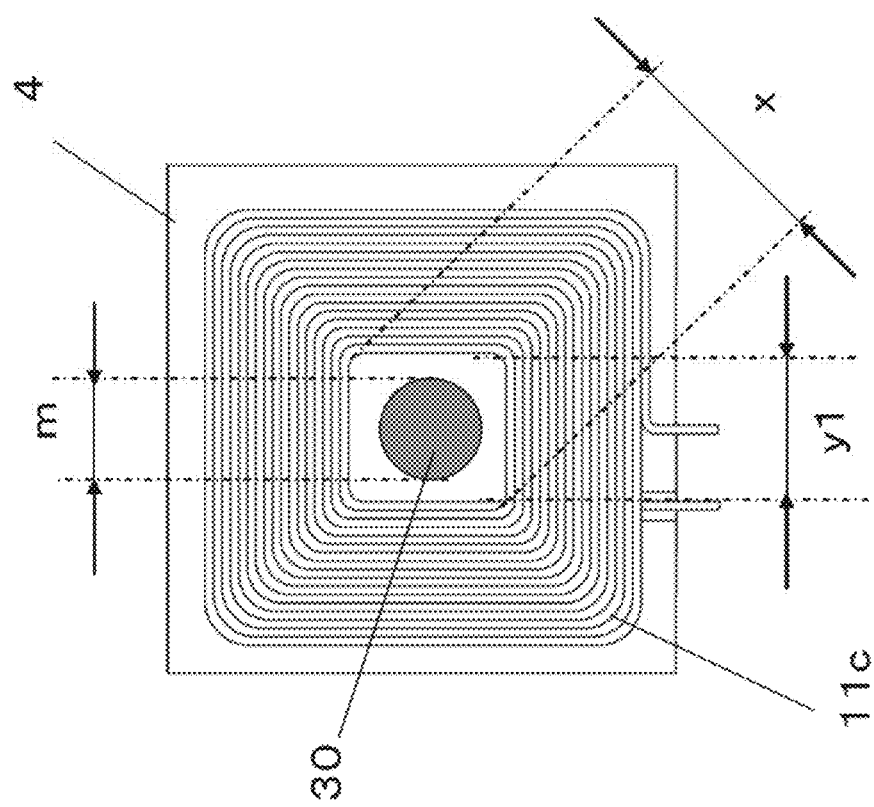

NON-CONTACT CHARGING MODULE AND RECEPTION-SIDE AND TRANSMISSION-SIDE NON-CONTACT CHARGING APPARATUSES USING THE SAME

TECHNICAL FIELD

The present invention relates to a non-contact charging module that has a planar coil portion made of spiral electrical lines and a magnetic sheet and a reception-side and transmission-side non-contact charging apparatuses using the same.

BACKGROUND ART

In recent years, apparatuses that can charge a body apparatus in a non-contact type using a charger are widely used. In the apparatuses, a transmission-side non-contact charging module is disposed on the side of the charger, a reception-side non-contact charging module is disposed on the side of the body apparatus, and electromagnetic induction is generated between the modules to supply power from the side of the charger to the side of the body apparatus. In addition, it is suggested to apply a portable terminal apparatus as the body apparatus.

It is demanded to decrease the thickness and the size of the body apparatus or the charger of this portable terminal apparatus. In order to meet the demand, it is considered to include a planar coil portion functioning as the transmission-side non-contact charging module or the reception-side non-contact charging module, and a magnetic sheet (refer to Patent Literature 1).

CITATION LIST

Patent Literature

PTL 1
Japanese Patent Application Laid-Open No. 2006-42519

SUMMARY OF INVENTION

Technical Problem

In this type of non-contact charging module, the position of a primary-side non-contact charging module (transmission-side non-contact charging module) and the position of a secondary-side non-contact charging module (reception-side non-contact charging module) need to be accurately aligned. This is to efficiently perform the electromagnetic induction to transmit power.

A method using a magnet is known as one method that accurately aligns the position of the primary-side non-contact charging module (transmission-side non-contact charging module) and the position of the secondary-side non-contact charging module (reception-side non-contact charging module). This method is a method in which the magnet is mounted to at least one of the primary-side non-contact charging module and the secondary-side non-contact charging module, the magnets of both sides or one magnet and the other magnetic sheet attract each other, and therefore aligning is performed.

A method that performs aligning without using the magnet is known as another method that accurately aligns the position of the primary-side non-contact charging module and the position of the secondary-side non-contact charging module. For example, this is a method in which a convex portion is formed in a charging surface of a charger mounted with the primary-side non-contact charging module, a concave portion is formed in an electronic apparatus mounted with the secondary-side non-contact charging module, the convex portion are fitted in the concave portion, and compulsory aligning of the primary-side non-contact charging module and the secondary-side non-contact charging module is physically (geometrically) performed. This is a method in which the primary-side non-contact charging module detects the position of a coil of the secondary-side non-contact charging module in order to automatically move the position of the coil of the primary-side non-contact charging module to the position of a coil of the secondary-side non-contact charging module. This is a method in which a plurality of coils are provided in the charger such that a portable apparatus is chargeable in all places of a charging surface of the charger.

However, in the case where the magnet is used in aligning of the primary-side non-contact charging module and the secondary-side non-contact charging module and the case where the magnet is not used, an L value of the coil that is provided in each non-contact charging module significantly changes. In the electromagnetic induction to supply power, the resonance frequency is determined using the L value of the coil that is provided in each non-contact charging module.

For this reason, in the case where the magnet is used in aligning of the primary-side non-contact charging module and the secondary-side non-contact charging module and the case where the magnets is not used, there is a problem that it is difficult to commonly use the non-contact charging module.

Therefore, in view of the above problems, it is an object of the present invention to provide a non-contact charging module and reception-side and transmission-side non-contact charging apparatuses using the same that can suppress a change in an L value of a coil provided in the non-contact charging module in both of the case where a magnet included in the other non-contact charging module is used when a primary-side non-contact charging module and a secondary-side non-contact charging module are aligned and the case where the magnet is not used, and can be used in both of the case where the magnet is used and the case where the magnet is not used.

Solution to Problem

In order to solve the above problems, the present invention has a feature of providing a non-contact charging module that has a case where using a magnet included in a counterpart-side non-contact charging module or a case where not using the magnet, when aligning with the counterpart-side non-contact charging module, the non-contact charging module includes: a planar coil portion where electrical lines are wound; and a magnetic sheet that places a coil surface of the planar coil portion and faces the coil surface of the planar coil portion, wherein a size of a hollow portion of the planar coil portion is more than a size of the magnet included in the counterpart-side non-contact charging module.

Advantageous Effects of Invention

According to the present invention, a non-contact charging module that does not change an L value of a coil provided in the non-contact charging module in both of the case where a magnet included in a counterpart-side non-contact charging module is used and the case where the magnet is not used when the primary-side non-contact charging module and the secondary-side non-contact charging module are aligned, so that it is possible to provide a non-contact charging module that can perform efficient aligning and power transmission in both of the case where the magnet is used and the case where the magnet is not used.

BRIEF DESCRIPTION OF DRAWINGS

FIG. 4 is a detailed diagram illustrating the primary-side non-contact charging module according to the embodiment of the present invention;

FIG. 6 is a diagram illustrating a secondary-side non-contact charging module according to the embodiment of the present invention;

FIG. 7 is a detailed diagram illustrating the secondary-side non-contact charging module according to the embodiment of the present invention;

FIG. 9 is a diagram illustrating a relation of the inner diameter of the coil and an L value of the coil;

FIG. 10 is a schematic diagram illustrating a position relation of a non-contact charging module according to the embodiment of the present invention and the magnet included in the other non-contact charging module performing power transmission;

DESCRIPTION OF EMBODIMENTS

Figure 1:
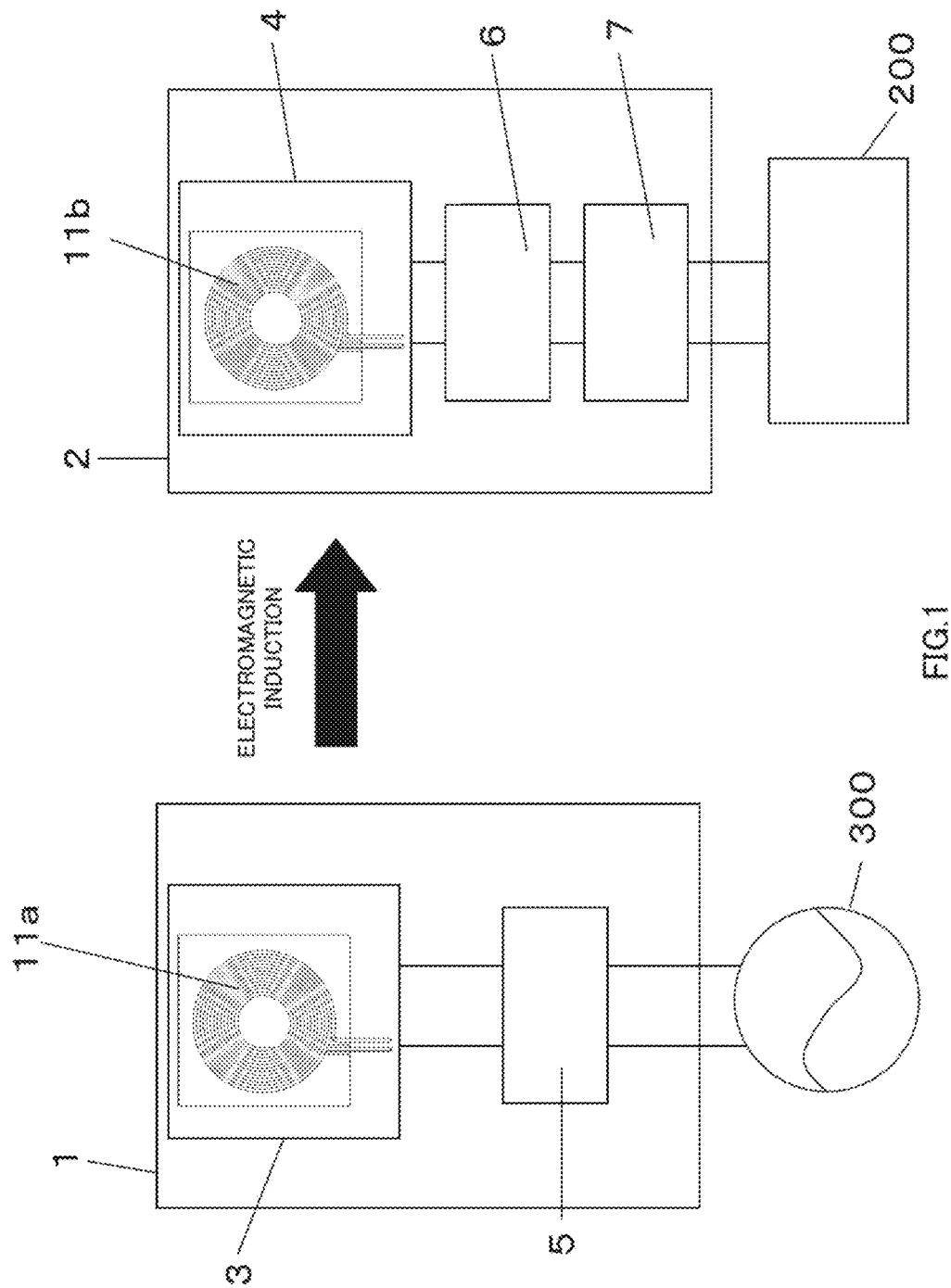
FIG. 1 is a block diagram illustrating a non-contact power transmitting apparatus according to an embodiment of the present invention.

In the invention according to Claim 1, a transmission-side non-contact charging module transmits power to a reception-side non-contact charging module by electromagnetic induction. The transmission-side non-contact charging module can perform aligning with the reception-side non-contact charging module by a first section performing aligning by using a magnet included in the reception-side non-contact charging module when aligning with the reception-side non-contact charging module is performed and a second section performing aligning by not using the magnet. The transmission-side non-contact charging module includes a planar coil portion where electrical lines are wound, a terminal that supplies a current from an external power supply to the planar coil portion, and a magnetic sheet that places a coil surface of the planar coil portion and faces the coil surface of the planar coil portion. A size of a hollow portion of the planar coil portion is more than a size of the magnet included in the reception-side non-contact charging module. Thereby, a transmission-side non-contact charging module and a transmission-side non-contact charging apparatus using the same that do not change an L value of a coil provided in the transmission-side non-contact charging module in both of the case where the magnet included in the reception-side non-contact charging module is used when a primary-side non-contact charging module and a secondary-side non-contact charging module are aligned and the case where the magnet is not used and can be used in both of the case where the magnet is used and the case where the magnet is not used can be configured.

In the invention according to Claim 2, the distance of an end of a hollow portion of the planar coil portion and an outer end of the magnet is larger than 0 mm and smaller than 6 mm. Thereby, the L values in the case where magnet 30$a$ is used and the case where magnet 30$a$ is not used can be set to be similar to each other while the L values are maintained at 15 μH or more.

In the invention according to Claim 3, the planar coil portion is configured such that an area of the magnet becomes 80 to 95% of an area of an inner circle of the planar coil portion, in a surface parallel to the planar coil portion. Thereby, the variation in the aligning precision can be resolved and the aligning precision of the primary-side non-contact charging module and the secondary-side non-contact charging module can be improved.

In the invention according to Claim 4, an area of the hollow portion of the coil portion is larger than an area of a circle having the diameter of 15.5 mm. Thereby, a transmission-side non-contact charging module and a transmission-side non-contact charging apparatus using the same that can be used in both of the case where a magnet is used and the case where a magnet is not used can be configured to any kind of magnet.

In the invention according to Claim 5, a transmission-side non-contact charging apparatus includes the planar coil portion that is included in the non-contact charging module according to any one of claims 1 to 4. Thereby, an L value of a coil provided in the transmission-side non-contact charging module is not changed in both of the case where the magnet is used when the transmission-side non-contact charging module and the reception-side non-contact charging module are aligned and the case where the magnet is not used. Therefore, the non-contact charging module can be used in both of the case where the magnet is used and the case where the magnet is not used.

In the invention according to Claim 6, the electrical lines of the planar coil are wound in a rectangular shape. Thereby, the distance of the counterpart-side magnet and the coil portion at each corner can be increased and an influence of the magnet can be suppressed.

Embodiment

Now, an embodiment of the present invention will be described in detail with reference to the accompanying drawings.

FIG. 1 is a block diagram illustrating a non-contact power transmitting apparatus according to an embodiment of the present invention.

The non-contact power transmitting apparatus includes primary-side non-contact charging module 1 (transmission-side non-contact charging module) and secondary-side non-contact charging module 2 (reception-side non-contact charging module) and transmits power from primary-side non-contact charging module 1 to secondary-side non-contact charging module 2 using an electromagnetic induction action. The non-contact power transmitting apparatus is used in transmitting power of about 5 W or less. The frequency of power transmission is about 110 to 205 kHz. Primary-side non-contact charging module 1 is mounted to a charger and secondary-side non-contact charging module 2 is mounted to, for example, a mobile phone, a digital camera, and a PC.

Primary-side non-contact charging module 1 includes primary-side coil 11a, magnetic sheet 3, resonance capacitor (not illustrated), and power input section 5. Power input section 5 is connected to commercial power supply 300 functioning as an external power supply, receives power of about 100 to 240 V, converts the power into a predetermined current (direct current 12 V, 1 A), and supplies the predetermined current to primary-side coil 11a. Primary-side coil 11a generates a magnetic field according to the shape thereof, the winding number thereof, and the supplied current. The resonance capacitor is connected to primary-side coil 11a and determines the resonance frequency of the magnetic field generated from primary-side coil 11a according to a relation with primary-side coil 11a. The electromagnetic induction action from primary-side non-contact charging module 1 to secondary-side non-contact charging module 2 is performed by the resonance frequency.

Meanwhile, secondary-side non-contact charging module 2 includes secondary-side coil 11b, magnetic sheet 4, resonance capacitor (not illustrated), rectifying circuit 6, and power output section 7. Secondary-side coil 11b receives the magnetic field generated from primary-side coil 11a, converts the magnetic field into a predetermined current by the electromagnetic induction action, and outputs the predetermined current to the outside of secondary-side non-contact charging module 2 through rectifying circuit 6 and power output section 7. Rectifying circuit 6 rectifies the predetermined current which is an alternating current and converts the predetermined current into a predetermined current which is a direct current (direct current 5 V, 1.5 A). Power output section 7 is an external output section of secondary-side non-contact charging module 2 and supplies power to electronic apparatus 200 connected to secondary-side non-contact charging module 2 through power output section 7.

Next, the case where primary-side non-contact charging module 1 is mounted to a non-contact charger will be described.

Figure 2:
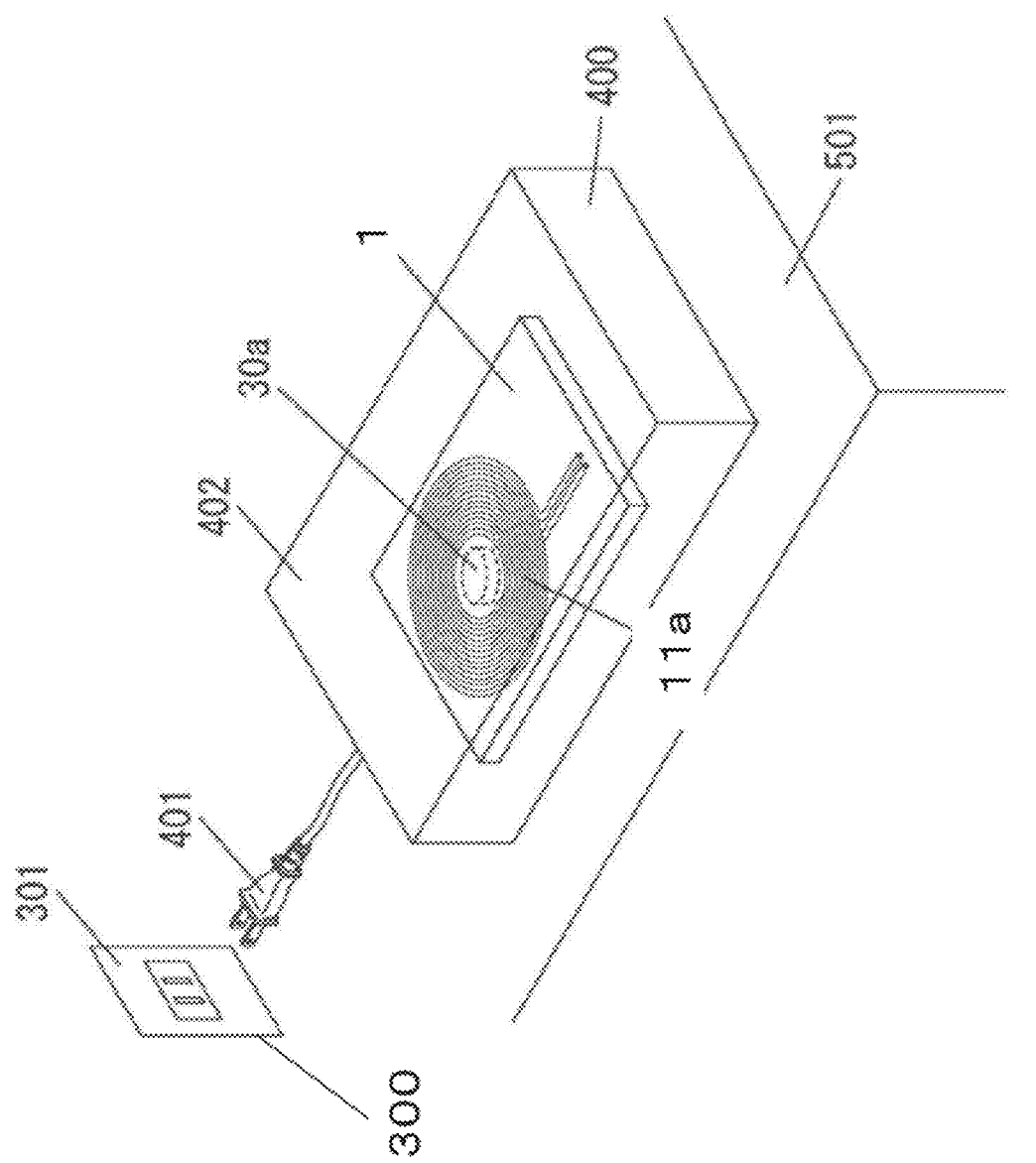
FIG. 2 is a diagram illustrating the configuration of a non-contact charger according to the embodiment of the present invention.

FIG. 2 is a diagram illustrating the configuration of a non-contact charger according to the embodiment of the present invention. An inner portion of the non-contact charger illustrated in FIG. 2 can be viewed.

Non-contact charger 400 that transmits power using the electromagnetic induction action has primary-side non-contact charging module 1 in a case constituting an exterior package.

Non-contact charger 400 has plug 401 that is plugged into outlet 301 of commercial power supply 300 disposed indoors or outdoors. By plugging plug 401 into outlet 301, non-contact charger 400 can receive power from commercial power supply 300.

Non-contact charger 400 is disposed on desk 501 and primary-side non-contact charging module 1 is disposed in the vicinity of surface 402 of the side opposite to the side of a desk surface of non-contact charger 400. A principal surface of primary-side coil 11a in primary-side non-contact charging module 1 is disposed in parallel to surface 402 of the side opposite to the side of the desk surface of non-contact charger 400. In this way, a power reception work area of the electronic apparatus mounted with secondary-side non-contact charging module 2 can be secured. Non-contact charger 400 may be disposed on a wall surface. In this case, non-contact charger 400 is disposed in the vicinity of a surface of the side opposite to the side of the wall surface.

Primary-side non-contact charging module 1 may have magnet 30a that is used in aligning with secondary-side non-contact charging module 2. In this case, magnet 30a is disposed in a hollow portion that is positioned at a center area of primary-side coil 11a.

Next, primary-side non-contact charging module 1 will be described.

Figure 3:
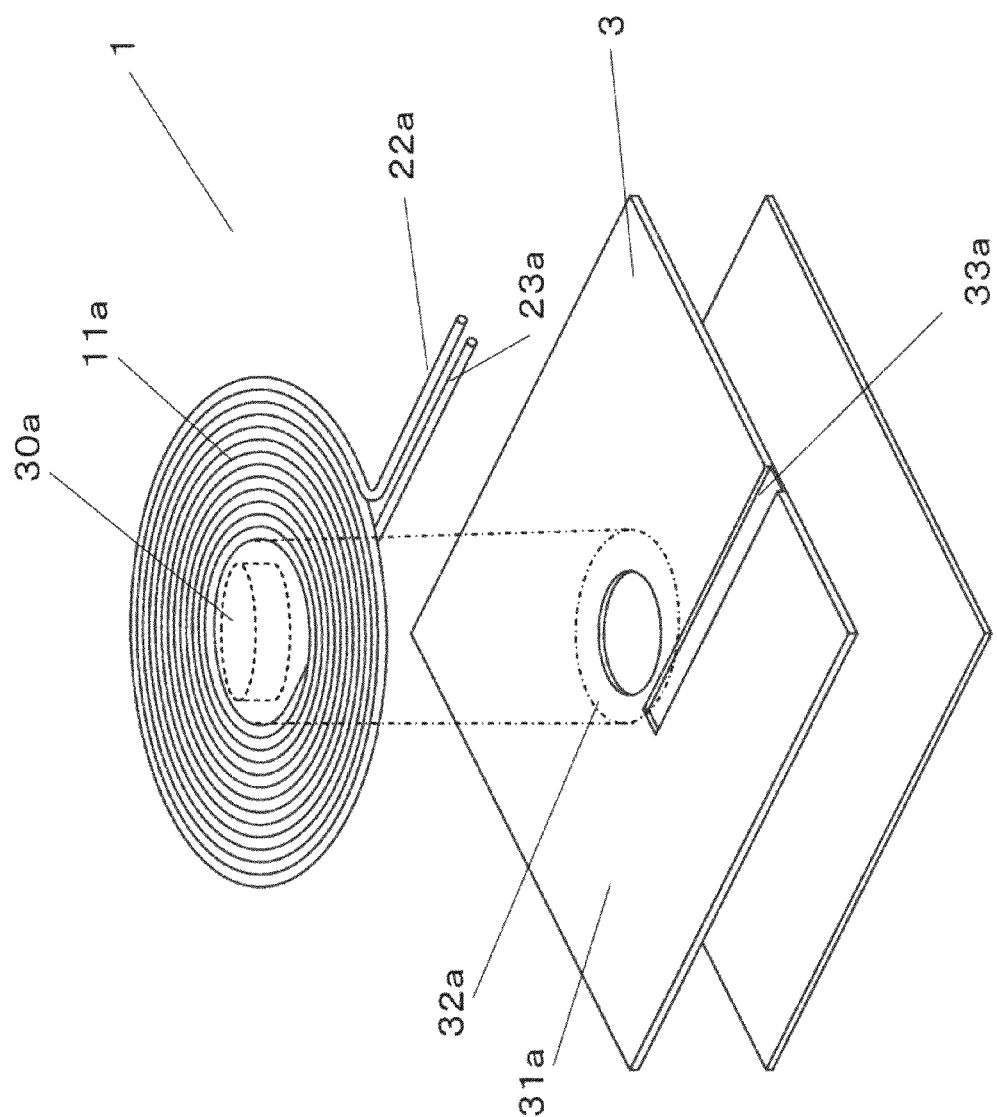
FIG. 3 is a diagram illustrating a primary-side non-contact charging module according to the embodiment of the present invention.

FIG. 3 is a diagram illustrating the primary-side non-contact charging module according to the embodiment of the present invention and illustrating the case where the primary-side coil is circular. Though FIG. 3 illustrates the primary-side coil that is a circular coil that is wound in a circular shape, the primary-side coil may be a rectangular coil that is wound in a substantially rectangular shape. The specific configuration of the primary-side non-contact charging module described hereinafter is basically applied to the secondary-side non-contact charging module. The difference of the primary-side non-contact charging module and the secondary-side non-contact charging module will be described in detail below.

Primary-side non-contact charging module 1 includes primary-side coil 11a where electrical lines are wound in a spiral shape and magnetic sheet 3 that is provided to face a surface of primary-side coil 11a.

As illustrated in FIG. 3, primary-side coil 11a includes a coil that is wound around a conductor in a radial direction to draw a whirlpool on the surface and terminals 22a and 23a that function as current supplying sections provided on both ends of the coil. That is, terminals 22a and 23a that function as the current Supplying sections supplies the current from commercial power supply 300 which is the external power supply to primary-side coil 11a. The coil is obtained by winding electrical lines in parallel on the plane and a surface that is formed by the coil is called a coil surface. The thickness direction is a stack direction of primary-side coil 11a and magnetic sheet 3.

Magnetic sheet 3 includes flat portion 31a that places primary-side coil 11a, center portion 32a that is a center portion of flat portion 31a and corresponds to a hollow area of primary-side coil 11a, and linear concave portion 33a that inserts a part of a leading line of primary-side coil 11a. In center portion 32a, a concave portion or a through-hole is formed with respect to flat portion 31a.

In primary-side non-contact charging module 1 according to the present embodiment, primary-side coil 11a is wound from an inner diameter where a diameter is 20 mm to the outside and an outer diameter of the primary-side coil becomes 30 mm. That is, primary-side coil 11a is wound in a doughnut shape. Primary-side coil 11a may be wound in a circular shape and may be wound in a polygonal shape.

By wounding the electrical lines to leave a space, the floating capacity between the electrical line of an upper stage and the electrical line of a lower stage decreases and alternating-current resistance of primary-side coil 11a can be suppressed to a minimum. In addition, the thickness of primary-side coil 11a can be suppressed by wounding the electrical lines densely.

Primary-side non-contact charging module 1 may have magnet 30a that is used in aligning with secondary-side non-contact charging module 2. In this case, a shape of magnet 30a is defined to a circular shape and a diameter thereof is defined to 15.5 mm or less by the standard (WPC). Magnet 30a has a coin shape and needs to be disposed such that a center thereof is matched with a winding center axis of primary-side coil 11a. This is to decrease an influence of magnet 30a with respect to primary-side coil 11a.

That is, as an aligning method, the following methods are used. For example, a method in which a convex portion is formed in a charging surface of a charger, a concave portion is formed in an electronic apparatus of the secondary side, the convex portion is fitted into the concave portion, and compulsory aligning is physically (geometrically) performed is used. A method in which a magnet is mounted to at least one of the primary side and the secondary side, the magnets of both sides or one magnet and the other magnetic sheet attract each other, and aligning is performed is used. A method in which the primary side detects the position of a coil of the secondary side to automatically move a coil of the primary side to the position of the coil of the secondary side is used. A method in which a plurality of coils are provided in a charger such that a portable apparatus is chargeable in all places of a charging surface of the charger is used.

As such, the various methods that are used in aligning the coils of the primary-side (charging-side) non-contact charging module and the secondary-side (charged-side) non-contact charging module are described. However, the methods are divided into methods performed with the magnet and methods performed without the magnet. In addition, according to the primary-side (charging-side) non-contact charging module, the primary-side non-contact charging module is configured to be adapted to both of the secondary-side (charged-side) non-contact charging module with the magnet and the secondary-side (charged-side) non-contact charging module without the magnet, and charging can be performed, regardless of a type of the secondary-side (charged-side) non-contact charging module. Therefore, convenience is improved. Likewise, according to the secondary-side (charged-side) non-contact charging module, the secondary-side non-contact charging module is configured to be adapted to both of the primary-side (charging-side) non-contact charging module with the magnet and using the magnet in aligning and the primary-side (charging-side) non-contact charging module without the magnet and not using the magnet in aligning, and charging can be performed, regardless of a type of the primary-side (charging-side) non-contact, charging module. Therefore, convenience is improved. That is, in the non-contact charging module that performs power transmission by the electromagnetic induction action with the other non-contact charging module which is a counterpart performing the power transmission and performs aligning using the magnet included in the other non-contact charging module or performs aligning without using the magnet when aligning with the other non-contact charging module is performed, the non-contact charging module needs to be configured to surely perform the power transmission.

As a first method that disposes magnet 30a in the case where primary-side non-contact charging module 1 has magnet 30a, a method that disposes magnet 30a on a top surface of center portion 32a of magnetic sheet 3 is known. As a second method that disposes magnet 30a, a method that disposes magnet 30a at the position instead of center portion 32a of magnetic sheet 3 is known. In the second method, since magnet 30a is disposed in the hollow area of the coil, a size of primary-side non-contact charging module 1 can be decreased.

When the magnet is not used in aligning of primary-side non-contact charging module 1 and secondary-side non-contact charging module 2, the magnet 30a illustrated in FIG. 3 is not needed.

In this case, an influence of the magnet with respect to power transmission efficiency of the non-contact charging module will be described. In general, the magnet is provided in the hollow portion of the coil incorporated in at least one of the primary-side non-contact charging Module and the secondary-side non-contact charging module. Thereby, the magnet and the magnet or the magnet and the magnetic sheet 3 can be placed closely each other as close as possible, and, at the same time, the primary-side coil and the secondary-side coil can be placed closely each other. The magnet is circular. In this case, the diameter of the magnet becomes smaller than the inner width of the coil. In the present embodiment, the diameter of the magnet is about 15.5 mm (about 10 to 20 min) and the thickness thereof is about 1.5 to 2 mm. A neodymium magnet may be used and the strength thereof may be about 75 to 150 mT. In the present embodiment, since an interval of the coil of the primary-side non-contact charging module and the coil of the secondary-side non-contact charging module is about 2 to 5 mm, sufficient aligning can be performed by the corresponding magnet.

When the magnetic flux is generated between the primary-side coil and the secondary-side coil to transmit power, if the magnet exists between the primary-side coil and the secondary-side coil and around the primary-side coil and the secondary-side coil, the magnetic flux extends to avoid the magnet. The magnetic flux that passes through the magnet becomes an eddy current or generates heat in the magnet and is lost. If the magnet is disposed in the vicinity of the magnetic sheet, the permeability of the magnetic sheet in the vicinity of the magnet may be decreased. Therefore, magnet 30a that is included in primary-side non-contact charging module 1 may decrease the L values of both primary-side coil 11a and secondary-side coil 11b. As a result, transmission efficiency between the non-contact charging modules may be decreased.

FIG. 4 is a detailed diagram illustrating the primary-side non-contact charging module according to the embodiment of the present invention. FIG. 4(a) is a top view of the primary-side non-contact charging module and FIG. 4(b) is a cross-sectional view taken along the line A-A of the primary-side non-contact charging module in FIG. 4(a). FIG. 4(c) is a cross-sectional view taken along the line B-B of the primary-side non-contact charging module in FIG. 4(a) in the case where a linear concave portion is provided. FIG. 4(d) is a cross-sectional view taken along the line B-B of the primary-side non-contact charging module in FIG. 4(a) in the case where a slit is provided. FIGS. 4(a) and 4(b) illustrate the case where magnet 30a is not included. When the magnet is included, magnet 30a illustrated by a dotted line is included.

Primary-side coil 11a achieves decreasing the thickness of non-contact charger 400 mounted with primary-side non-contact charging module 1. For this reason, an area from a winding starting portion positioned in a center area of primary-side coil 11a to terminal 23a is configured as two stages in the thickness direction and the remaining area is configured as one stage. At this time, the electrical line of the upper stage and the electrical line of the lower stage are wound to leave a space, the floating capacity between the electrical line of the upper stage and the electrical line of the lower stage decreases, and the alternating-current resistance of primary-side coil 11a can be suppressed to a minimum.

When the electrical lines are stacked and primary-side coil 11a is extended in the thickness direction of primary-side non-contact charging module 1, the amount of current that flows to primary-side coil 11a can be increased by increasing the winding number of primary-side coil 11a. When the electrical lines are stacked, if the electrical line of the upper stage and the electrical line of the lower stage are wound densely the thickness of primary-side coil 11a is suppressed, and the amount of current flowing to primary-side coil 11a can be increased.

In the present embodiment, primary-side coil 11a is formed using the electrical lines having a circular cross-sectional shape. However, the electrical lines that have a rectangular cross-sectional shape may be used. When the electrical lines having the circular cross-sectional shape are used, gaps are generated between the electrical lines adjacent to each other. For this reason, the floating capacity between the electrical lines decreases and the alternating-current resistance of primary-side coil 11a can be suppressed to a minimum.

It is preferable to wind primary-side coil 11a in one stage in the thickness direction, instead of winding primary-side coil 11a in two stages in the thickness direction, because the alternating-current resistance of primary-side coil 11a decreases and transmission efficiency can be increased. This is because the floating capacity is generated between the electrical line of the upper stage and the electrical line of the lower stage, if the electrical lines are wound in the two stages. Therefore, it is preferable to wind most of the parts of primary-side coil 11a in one stage, instead of winding all of the parts of primary-side coil 11a in two stages. By winding primary-side coil 11a in one stage, primary-side non-contact charging module 1 can be formed to have the small thickness. When a planar coil portion is configured by the two electrical lines, the two electrical lines are electrically connected by solder in portions of terminals 22a and 23a. For this reason, the two electrical lines may be configured as one thick electrical line. The two electrical lines may be wound in parallel to the coil surface and may be wound vertically to the coil surface. That is, when the two electrical lines are parallel to the coil surface, the two electrical lines are wound around the same center in a planar shape and one electrical line is inserted into the other electrical line in the radial direction. As such, the two electrical lines are bonded in the portions of terminals 22a and 23a to function as one electrical line, and the thickness can be suppressed even though the electrical lines have the same cross-sectional area. That is, the cross-sectional area of the electrical line where the diameter is 0.25 mm can be obtained by preparing two electrical lines where the diameter is 0.18 mm. Therefore, if one electrical line where the diameter is 0.25 mm is prepared, the thickness of one turn of the coil is 0.25 mm and the width of the coil in the radial direction is 0.25 mm. However, if two electrical lines where the diameter is 0.18 mm are prepared, the thickness of one turn of the coil is 0.18 mm and the width of the coil in the radial direction is 0.36 mm. The thickness direction is a stack direction of the planar coil portion and magnetic sheet 3. Only parts of the center side of the coil may overlap in two stages in the thickness direction and the remaining part of the outside may be configured as one stage. In the case where the electrical lines are wound vertically to the coil surface, the thickness of non-contact charging module 1 increases. However, the cross-sectional area of the electrical line increase substantially, the amount of current that flows to the planar coil portion can be increased, and the sufficient winding number can be easily secured. In the present embodiment, primary-side coil 11a is configured by the electrical lines having the diameter of about 0.18 to 0.35 mm. In primary-side coil 11a of primary-side non-contact charging module 1, the electrical lines having the diameter of 0.25 to 0.35 mm are preferable.

The loss in primary-side coil 11a can be prevented by decreasing the alternating-current resistance of primary-side coil 11a and power transmission efficiency of primary-side non-contact charging module 1 that depends on the L value can be improved by improving the L value.

In the present embodiment, primary-side coil 11a is formed in an annular shape (circular shape). A shape of primary-side coil 11a is not limited to the annular shape (circular shape) and may be an elliptical shape, a rectangular shape, and a polygonal shape. If aligning of primary-side non-contact charging module 1 and secondary-side non-contact charging module 2 is considered, the shape of primary-side coil 11a is preferably the annular shape (circular shape). This reason is as follows. When the shape of primary-side coil 11a is the annular shape (circular shape), because transmission/reception of power can be performed over a wider range, aligning of primary-side coil 11a of primary-side non-contact charging module 1 and secondary-side coil 11b of secondary-side non-contact charging module 2 can be easily performed. That is, since transmission/reception of the power can be performed over a wider range, it is difficult that secondary-side non-contact charging module 2 receives an influence of an angle with respect to primary-side non-contact charging module 1.

Terminals 22a and 23a may be placed closely each other and may be apart from each other. However, when terminals 22a and 23a are apart from each other, primary-side non-contact charging module 1 may be easily mounted.

Magnetic sheet 3 is provided to improve power transmission efficiency of non-contact charging using the electromagnetic induction action, and includes flat portion 31a, center portion 32a that is a center and corresponds to an inner diameter of primary-side coil 11a, and linear concave portion 33a. When magnet 30a is provided to perform aligning of primary-side non-contact charging module 1 and secondary-side non-contact charging module 2, magnet 30a may be disposed on center portion 32a and may be disposed at the position instead of center portion 32a. A concave portion or a through-hole may be provided in a portion that corresponds to the hollow portion of coil 11a of magnetic sheet 3.

As magnetic sheet 3, a ferrite sheet of the Ni—Zn system, a ferrite sheet of the Mn—Zn system, and a ferrite sheet of the Mg—Zn system and the like may be used. Magnetic sheet 3 may be configured as a single layer, may be configured by stacking a plurality of sheets made of the same material in the thickness direction, and may be configured by stacking a plurality of different magnetic sheets in the thickness direction. Magnetic sheet 3 is preferably configured such that the permeability is 250 or more and the saturation magnetic flux density is 350 mT or more.

An amorphous metal may be used as magnetic sheet 3. When the ferrite sheet is used as magnetic sheet 3, the alternating-current resistance of primary-side coil 11a can be decreased, and when the amorphous metal is used as magnetic sheet, the thickness of primary-side coil 11a can be decreased. The shape of magnetic sheet 3 may be a circular shape, a rectangular shape, a polygonal shape, and a rectangular shape and a polygonal shape having large curved lines at four corners.

Next, an influence of the magnet with respect to primary-side non-contact charging module 1 and secondary-side non-contact charging module 2 (described later) will be described. The magnetic field that is generated by primary-side non-contact charging module 1 is received by secondary-side coil 11b in secondary-side non-contact charging module 2 to transmit power. In this case, if the magnet is disposed around primary-side coil 11a and secondary-side coil 11b, the magnetic field may be generated to avoid the magnet or the magnetic field that passes through the magnet may be removed. The permeability of a part of magnetic sheet 3 that is close to the magnet may decrease. That is, the magnetic field is weakened by the magnet. Therefore, in order to minimize the magnetic field weakened by the magnet, a countermeasure is necessary for primary-side coil 11a and secondary-side coil 11b to be apart from the magnet or magnetic sheet 3 that is difficult to be affected by the magnet.

Next, the case where secondary-side non-contact charging module 2 is mounted to a portable terminal apparatus will be described.

Figure 5:
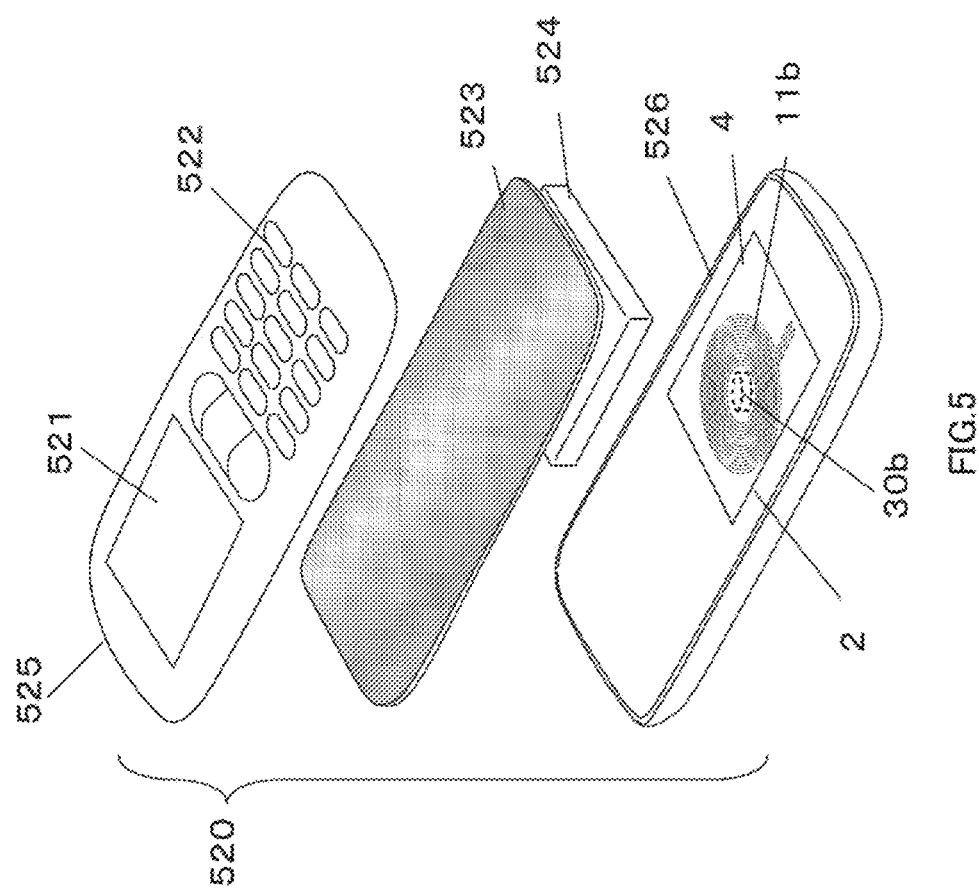
FIG. 5 is a diagram illustrating the configuration of a portable terminal apparatus according to the embodiment of the present invention.

FIG. 5 is a diagram illustrating the configuration of a portable terminal apparatus according to the embodiment of the present invention and is a perspective view illustrating the exploded portable terminal apparatus.

Portable terminal apparatus 520 includes liquid crystal panel 521, operation button 522, substrate 523, battery pack 524 and the like. Portable terminal apparatus 520 that receives power using the electromagnetic induction action is a portable terminal apparatus that includes secondary-side non-contact charging module 2 in casing 525 and casing 526 forming an exterior package thereof.

On a back surface of casing 525 where liquid crystal panel 521 and operation button 522 are provided, substrate 523 including a control section that receives information input from operation button 522, displays needed information on liquid crystal panel 521, and controls entire portable terminal apparatus 520 is provided. In addition, on the back surface of substrate 523, battery pack 524 is provided. Battery pack 524 is connected to substrate 523 and supplies power to substrate 523.

On the back surface of battery pack 524, that is, on the side of casing 526, secondary-side non-contact charging module 2 is provided. Secondary-side non-contact charging module 2 receives power from primary-side non-contact charging module 1 by the electromagnetic induction action and charges battery pack 524 using the power.

Secondary-side non-contact charging module 2 includes secondary-side coil 11b, magnetic sheet 4 and the like. When a power supply direction is set to the side of casing 526, if secondary-side coil 11b and magnetic sheet 4 are disposed sequentially from the side of casing 526 between casing 526 and substrate 523, an influence of substrate 523 and battery pack 524 can be alleviated and power can be received. Although FIG. 5 illustrates a state in which magnetic sheet 4 is disposed closer to the side of casing 526 than secondary-side coil 11b, FIG. 5 schematically illustrates the configuration for easy understanding. In practice, as described above, secondary-side coil 11b and magnetic sheet 4 are disposed sequentially from the side of casing 526.

Next, secondary-side non-contact charging module 2 will be described.

FIG. 6 is a diagram illustrating the secondary-side non-contact charging module according to the embodiment of the present invention and illustrating the case where the secondary-side coil is a circular coil.

FIG. 7 is a detailed diagram illustrating the secondary-side non-contact charging module according to the embodiment of the present invention. FIG. 7(a) is a top view of the secondary-side non-contact charging module and FIG. 7(b) is a cross-sectional view taken along the line C-C of the secondary-side non-contact charging module in FIG. 7(a). FIG. 7(c) is a cross-sectional view taken along the line D-D of the secondary-side non-contact charging module in FIG. 7(a) in the case where a linear concave portion is provided. FIG. 7(d) is a cross-sectional view taken along the line D-D of the secondary-side non-contact charging module in FIG. 7(a) in the case where a slit is provided. FIGS. 7(a) and 7(b) illustrate the case where magnet 30b is not included. In the case where the magnet is included, magnet 30b that is illustrated by a dotted line is included.

FIGS. 6 and 7 that illustrate secondary-side non-contact charging module 2 correspond to FIGS. 3 and 4 that illustrate primary-side non-contact charging module 1. The configuration of secondary-side non-contact charging module 2 is substantially the same as the configuration of primary-side non-contact charging module 1.

Secondary-side non-contact charging module 2 is different from primary-side non-contact charging module 1 in the size and the material of magnetic sheet 4. Magnetic sheet 4 that is used in secondary-side non-contact charging module 2 has the size that is smaller than about 40×40 mm and the thickness that is about 2 mm or less.

The size of magnetic sheet 3 that is used in primary-side non-contact charging module 1 is different from the size of magnetic sheet 4 that is used in secondary-side non-contact charging module 2. This is because secondary-side non-contact charging module 2 is generally mounted to a portable electronic apparatus and reducing the size is required. In the present embodiment, magnetic sheet 4 is substantially square and has the size of about 33×33 mm. It is demanded to form magnetic sheet 4 with the size equal to or larger than the size of an outer circumferential end of secondary-side coil 11b. The shape of magnetic sheet 3 may be a circular shape, a rectangular shape, a polygonal shape, and a rectangular shape and a polygonal shape having large curved lines at four corners.

Since secondary-side non-contact charging module 2 is used in a portable terminal as the reception side of power supply, an occupation space of secondary-side non-contact charging module 2 in the portable terminal has no room. Since the amount of current flowing to secondary-side coil 11b of secondary-side non-contact charging module 2 is small, an insulating property of magnetic sheet 4 is not so required. In the present embodiment, secondary-side coil 11b is configured using the electrical lines having the diameter of about 0.18 to 0.35 mm and the electrical lines having the diameter of about 0.18 to 0.30 mm are preferable in secondary-side coil 11b of secondary-side non-contact charging module 2.

When the mounted electronic apparatus is a mobile phone, the secondary-side non-contact charging module is generally disposed between the case constituting the exterior package of the mobile phone and the battery packet positioned in the mobile phone. In general, since the battery pack is a casing made of aluminum, the battery pack adversely affects power transmission. This is because the eddy current is generated in the aluminum in a direction weakening the magnetic flux generated by the coil and the magnetic flux of the coil is weakened. For this reason, an influence with respect to the aluminum needs to be alleviated by providing magnetic sheet 4 between the aluminum which is the exterior package of the battery pack and secondary-side coil 11b disposed on the exterior package thereof.

Next, a relation of a size of magnet 30a and a size of the inner diameter of primary-side coil 11a will be described. Here, the case where magnet 30a is disposed on primary-side non-contact charging module 1 will be described. However, the same relation is realized in the case where magnet 30b is disposed on secondary-side non-contact charging module 2. In this case, magnet 30b corresponds to magnet 30a.

FIG. 8 is a diagram illustrating a relation of the primary-side non-contact charging module including the magnet and the secondary-side non-contact charging module. FIG. 8(a) illustrates the case where the aligning magnet is used when the inner width of the coil is small, FIG. 8(b) illustrates the case where the aligning magnet is used when the inner width of the coil is large, FIG. 8(c) illustrates the case where the aligning magnet is not used when the inner width of the coil is small, and FIG. 8(d) illustrates the case where the aligning magnet is not used when the inner width of the coil is large. In FIG. 8, primary-side non-contact charging module 1 including magnet 30a and secondary-side coil 11b of secondary-side non-contact charging module 2 performing power transmission are illustrated. However, the description of secondary-side coil 11b according to the relation of secondary-side non-contact charging module 2 described below is applied to secondary-side non-contact charging module 2 including magnet 30b and primary-side coil 11a of primary-side non-contact charging module 1 performing power transmission. That is, a planar coil portion of the non-contact charging module where aligning and power transmission can be performed in both of the case where the other non-contact charging module to be the counterpart of power transmission includes the magnet and the case where the other non-contact charging module does not include the magnet will be described. FIG. 9 is a diagram illustrating a relation of the inner diameter of the coil and an L value of the coil.

In the drawings, magnet 30a is stored in only the through-hole of primary-side coil 11a. However, magnet 30a may be stored in the through-hole of secondary-side coil 11b.

Figure 8A:
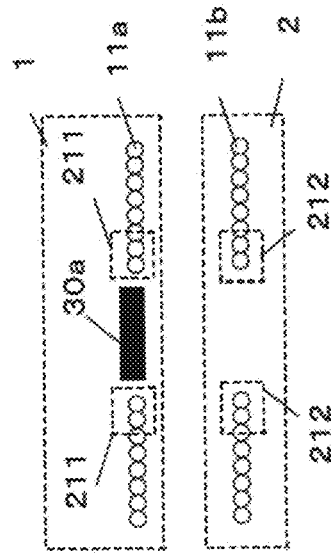
FIG. 8 is a diagram illustrating a relation of the primary-side non-contact charging module including a magnet and the secondary-side non-contact charging module.

Primary-side coil 11a and secondary-side coil 11b face each other. In inner portions 211 and 212 of coils 11a and 11b, the magnetic field is generated and power is transmitted. Inner portions 211 and 212 face each other. Inner portions 211 and 212 are close to magnet 30a and may easily receive adverse effects from magnet 30a. That is, when the magnetic flux is generated between the primary-side coil and the secondary-side coil to transmit power, if the magnet exists between the primary-side coil and the secondary-side coil and around the primary-side coil and the secondary-side coil, the magnetic flux extends to avoid the magnet. The magnetic flux that passes through the magnet becomes an eddy current or generates heat in the magnet, and is lost. If the magnet is disposed in the vicinity of the magnetic sheet, the permeability of the magnetic sheet in the vicinity of the magnet may be decreased. Therefore, magnet 30a that is included in primary-side non-contact charging module 1 may decrease the magnetic flux of both primary-side coil 11a and secondary-side coil 11b, particularly, inner portions 211 and 212 and may exert a bad influence. As a result, transmission efficiency between the non-contact charging modules may be decreased. Therefore, in the case of FIG. 8(a), inner portions 211 and 212 that may easily receive adverse effects from magnet 30a may increase. Meanwhile, in the case of FIG. 8(c) where the magnet is not used, since the winding number of secondary-side coil 11b is large, the L value increases. As a result, since a decrease ratio of a numerical value from the L value in FIG. 8(c) to the L value in FIG. 8(a) is large, a decrease ratio of the L value may greatly increase in the case where magnet 30a is included for aligning and the case where magnet 30a is not included, in the coil where the inner width is small. As illustrated in FIG. 8(a), if the inner width of secondary-side coil 11b is smaller than the diameter of magnet 30a, secondary-side coil 11b may receive adverse effects directly from magnet 30a by an area facing magnet 30a. Therefore, the inner width of secondary-side coil 11b may be larger than the diameter of magnet 30a.

Figure 8B:
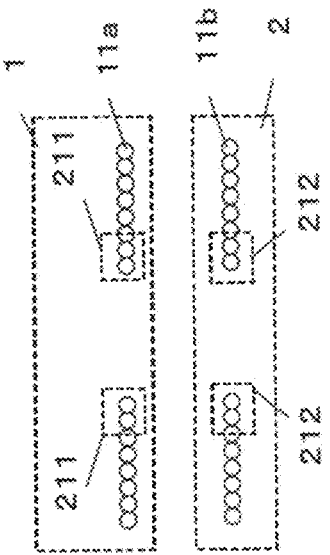
Figure 8C:
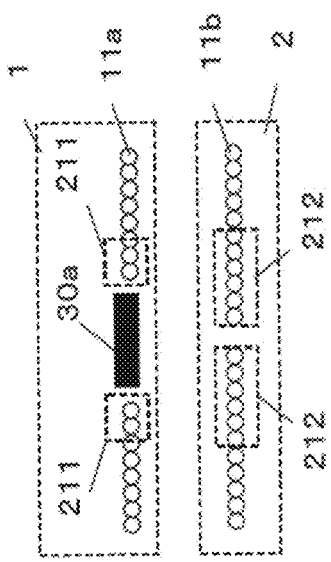
Figure 8D:
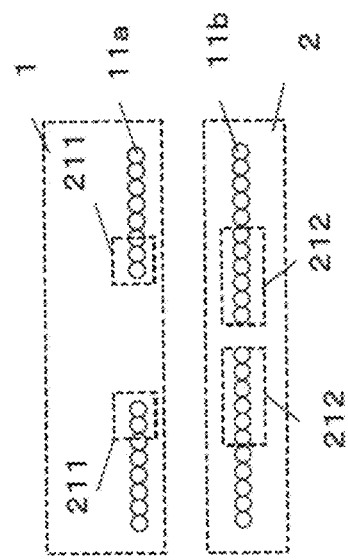

As illustrated in FIG. 8(b), if the inner width of the coil is large, inner portions 211 and 212 that may easily receive adverse effects from magnet 30a greatly decrease. In the case of FIG. 8(d) where the magnet is not used, since the winding number of secondary-side coil 11b decreases, the L value becomes smaller than the L value in the case of FIG. 8(c). As a result, since the decrease ratio of the numerical value from the L value in FIG. 8(d) to the L value in FIG. 8(b) is small, the decrease ratio of the L value can be minimally suppressed in the coil where the inner width is large. If the inner width of secondary-side coil 11b increases, because the end of the hollow portion of coil 11b is apart from magnet 30a, an influence of magnet 30a can be suppressed. However, since the non-contact charging module is mounted to the charger or the electronic apparatus and the like, it is not possible to form the non-contact charging module larger than a predetermined size. Therefore, if the inner widths of coils 11 and 11b are increased to decrease adverse effects from magnet 30a, the winding number may decrease and the L value may decrease without depending on whether or not the magnet exists. When magnet 30a has a circular shape, magnet 30a is as follows. That is, when the outer diameter of magnet 30a and the inner width of coil 11b are almost equal to each other ('outer diameter of magnet 30a is smaller than the inner width of coil 11b by about 0 to 2 mm), magnet 30a can be maximized, so that it is possible to improve aligning precision of the primary-side non-contact charging module and the secondary-side non-contact charging module. Since the inner diameter of coil 11b can be minimized, it is possible to improve the winding number of coil 11b increases and the L value. When the outer diameter of magnet 30a is smaller than the inner width of coil 11b (outer diameter of magnet 30a is smaller than the inner width of coil 11b by about 2 to 8 mm), it is possible to make magnet 30a not be provided between the facing portions of inner portions 211 and 212, even though a variation exists in aligning precision. At this time, if the outer diameter of magnet 30a is 70 to 95% of the inner width of coil 11b, the variation in the aligning precision can be sufficiently resolved, so that it is possible to improve aligning precision of the primary-side non-contact charging module and the secondary-side non-contact charging module. The winding number of coil 11b can be secured. This means that an area of magnet 30a is 70 to 95% of an area of the through-hole of the center of the planar coil portion, in a surface parallel to the planar coil portion. By this configuration, even in a case where the aligning magnet is included in the other non-contact charging module to be the counterpart of power transmission or a case where the magnet is not included, the change of the L value of the planar coil in the non-contact charging module due to existence or non-existence of the magnet decreases, so that it is possible to perform aligning or power transmission. That is, secondary-side non-contact charging module 2 can efficiently perform aligning with primary-side non-contact charging module 1 and power transmission, in both of the case where magnet 30a is included in primary-side non-contact charging module 1 and the case where magnet 30a is not included in primary-side non-contact charging module 1. In addition, primary-side non-contact charging module 1 can efficiently perform aligning with secondary-side non-contact charging module 2 and power transmission, in both of the case where magnet 30b is included in secondary-side non-contact charging module 2 and the case where magnet 30b is not included in secondary-side non-contact charging module 2. Primary-side coil 11a forms an LC resonance circuit with a resonance capacitor, in primary-side non-contact charging module 1. At this time, if the L values greatly change in the case where the magnet is used in aligning and the case where the magnet is not used in aligning, the resonance frequency with the resonance capacitor may greatly change. This resonance frequency is used in power transmission of primary-side non-contact charging module 1 and secondary-side non-contact charging module 2. For this reason, if the resonance frequency greatly changes according to existence or non-existence of the magnet, power transmission may not be correctly performed. However, power transmission can be efficiently performed by the above configuration.

Furthermore, as illustrated in FIG. 9, when the size of magnet 30a and the outer diameter of secondary-side coil 11b are constant, if the inner diameter of secondary-side coil 11b is increased by decreasing the winding number of secondary-side coil 11b, an influence of magnet 30a with respect to secondary-side coil 11b decreases. That is, the L values of secondary-side coil 11b in the case where magnet 30a is used in aligning of primary-side non-contact charging module 1 and secondary-side non-contact charging module 2 and magnet 30a is not used become values similar to each other. Therefore, the resonance frequency of when magnet 30a is used and the resonance frequency of when magnet 30a is not used become very similar to each other. At this time, the outer diameter of the coil is set to 30 mm. The distance of the end of the hollow portion of primary-side coil 11a and the outer end of magnet 30a is set to be larger than 0 mm and smaller than 6 mm, so that it is possible to set the L values similar to each other, in the case where magnet 30a is used and the case where magnet 30a is not used, while the L values are maintained at 15 μH or more. The result of FIG. 9 is applied to the L value of primary-side coil 11a of primary-side non-contact charging module 1 in the case where magnet 30b is included in secondary-side non-contact charging module 2.

FIG. 10 is a schematic diagram illustrating a position relation of the non-contact charging module according to the embodiment of the present invention and the magnet included in the other non-contact charging module performing power transmission. In this case, the primary-side non-contact charging module includes the magnet that is used in aligning of the primary-side non-contact charging module and the secondary-side non-contact charging module. FIG. 10(a) illustrates the case where the secondary-side coil has a rectangular shape and FIG. 10(b) illustrates the case where the secondary-side coil has a circular shape. In the non-contact charging module that is illustrated in these drawings, the explanation where the concave portion or the through-hole that exists in the hollow portion of the coil portion of the magnetic sheet will be omitted.

At this time, the relation of the magnet and the non-contact charging module is applied to both a relation of primary-side non-contact charging module 1 and magnet 30b provided in secondary-side charging module 2, and a relation of secondary-side non-contact charging module 2 and magnet 30a provided in primary-side non-contact charging module 1. Therefore, the relation of secondary-side non-contact charging module 2 and magnet 30a provided in primary-side non-contact charging module 1 is described. However, the relation is applied to the relation of primary-side non-contact charging module 1 and magnet 30b provided in secondary-side non-contact charging module 2. That is, a non-contact charging module that can suppress an influence of the magnet included in the other non-contact charging module that is the counterpart of power transmission and perform aligning and power transmission in both of the case where the magnet is included in the other non-contact charging module and the case where the magnet is not included in the other non-contact charging module will be described.

Secondary-side coil 11c illustrated in FIG. 10(a) and secondary-side coil 11b illustrated in FIG. 10(b) are positioned such that the centers thereof are aligned with the center of aligning magnet 30a. In addition, secondary-side non-contact charging module 2 may include the magnet, even when primary-side non-contact charging module 1 does not include magnet 30a.

Aligning magnet 30a that is included in the counterpart-side non-contact charging module has the diameter m and a circular shape, and magnetic sheet 4 has a square shape. Magnetic sheet 4 may have a polygonal shape or a rectangular shape other than the square shape or may have curved lines at corners. However, magnetic sheet 4 preferably has the square shape in order to decrease the size while securing performance of primary-side non-contact charging module 1 that is the counterpart side.

Since the standard of aligning magnet 30a is suggested when non-contact charging modules 1 and 2 are used, aligning magnet 30a is used to secure power transmission between non-contact charging modules 1 and 2 and to align the transmission and reception coils.

When rectangular secondary-side coil 11c and circular secondary-side coil 11b having the same winding number are disposed on magnetic sheets 4 having the same size, secondary-side coil 11c and secondary-side coil 11b are stored in magnetic sheets 4 having the same area. That is, as illustrated in FIGS. 10(a) and 10(b), when rectangular secondary-side coil 11c and circular secondary-side coil 11b having the same winding number are disposed on magnetic sheets 4 having the length of one side, the shortest distance y1 between facing inner sides of rectangular secondary-side coil 11c and the inner diameter y2 of circular secondary-side coil 11b can be set to the same length.

Meanwhile, the length x of a diagonal line of the inner side of rectangular secondary-side coil 11c is longer than the shortest distance y1 between the facing inner sides of rectangular secondary-side coil 11b having the same length as the inner diameter y2 of circular secondary-side coil 11b. That is, in rectangular secondary-side coil 11c, an area increases where an interval of aligning magnet 30a and secondary-side coil 11c is large, as compared with circular secondary-side coil 11b. That is, a relation of x>y1 and y1=y2 is realized.

In order to suppress an influence of the magnet included in primary-side non-contact charging module 1 or secondary-side non-contact charging module 2, the rectangular coil needs to satisfy a relation of x>=m, preferably, y1>=m.

If an interval of secondary-side coil 11b or 11c and aligning magnet 30a increases, an influence of aligning magnet 30a decreases. For this reason, a decrease ratio of the L value of secondary-side coil 11b or 11c can be decreased. In the case where the secondary-side coil has a rectangular shape, when the dimension x of the diagonal line of the inner side of secondary-side coil 11c is equal to the dimension y2 of the inner diameter of circular secondary-side coil 11b, a decrease ratio of the L value of secondary-side coil 11c becomes substantially equal to a decrease ratio of the L value of secondary-side coil 11b.

For this reason, when a space to store primary-side non-contact charging module 1 of non-contact charger 400 has a square shape and the space is limited, it is preferable to form magnetic sheet 4 in a square shape and form secondary-side coil 11c in a rectangular shape. Thereby, as compared with the circular coil, rectangular secondary-side coil 11c can be apart from magnet 30a and rectangular secondary-side coil 11c rarely receives an influence of magnet 30a. The magnetic flux of rectangular secondary-side coil 11c is concentrated on the corners. However, since the distance of the corners and magnet 30a is large, an influence of magnet 30a can be decreased.

That is, when secondary-side coil 11b is wound in a circular shape, entire secondary-side coil 11b has almost the same strength of the magnetic flux. However, when secondary-side coil 11b is wound in a substantially rectangular shape, the magnetic flux is concentrated on the corners. Therefore, if the dimension x of the diagonal line of the inner side of secondary-side coil 11c is located outside of the outer diameter of aligning magnet 30a (x≥m), an influence of magnet 30a can be suppressed and power can be transmitted. If the shortest distance y1 between facing inner sides of secondary-side coil 11b is located outside of the outer diameter of aligning magnet 30a (y1≥m), entire secondary-side coil 11c is positioned outside than the outer diameter of aligning magnet 30a and the corners of secondary-side coil 11b are positioned at the constant distance from magnet 30a. Therefore, an influence of magnet 30a with respect to secondary-side coil 11b can be decreased.

In the present embodiment, in order to satisfy the above-described relation, the dimension x of the diagonal line of rectangular secondary-side coil 11c is set to about 23 mm and the diameter m of aligning magnet 30a is set to 15.5 mmϕ. Generally, aligning magnet 30a is assumed to have the maximum diameter of 15.5 mm and configured smaller than the maximum diameter of 15.5 mm. When a small size and aligning precision are considered, aligning can be performed with a good balance by setting the diameter of magnet 30a to about 10 to 15.5 mm and setting the thickness to about 1.5 to 2 mm. A neodymium magnet may be used and the strength thereof may be about 75 to 150 mT. In the present embodiment, since an interval of the coil of the primary-side non-contact charging module and the coil of the secondary-side non-contact charging module is about 2 to 5 mm, it is possible to perform sufficient aligning by the corresponding magnet. Therefore, if the secondary-side coil is wound in a circular shape, the diameter of the hollow portion is set to 15.5 mm or more, and if the secondary-side coil is wound in a rectangular shape, the length of the diagonal line of the hollow portion is set to 15.5 min or more, preferably, the side width of the hollow portion is set to 15.5 mm or more. As a result, an influence of magnet 30a can be decreased, regardless of the size of magnet 30a included in the counterpart side.

As described above, the rectangular coil is less influenced by the magnet than the magnet in the circular coil. However, if both primary-side coil 11a and secondary-side coil 11b described later are rectangular coils, the corners need to be aligned when charging and aligning are performed. Therefore, since angular adjustment at the time of aligning is difficult, one coil may be a circular coil and the other coil may be a rectangular coil. That is, this is because the angle adjustment does not need to be performed and the rectangular coil can suppress an influence of the magnet. In addition, although one of primary-side non-contact charging module 1 and secondary-side non-contact charging module 2 may include the rectangular coil and the other may include the circular coil, since the circular coil may efficiently perform power transmission without depending on a shape of the coil becoming the counterpart of power transmission, primary-side non-contact charging module 1 may include the circular coil.

In the rectangular coil, R (radius of the curved lines of the four corners) of angular portions of the four corners of the hollow portion is 30% or less of the side width (y1 of FIG. 10(a)) of the hollow portion, as compared with the circular coil. That is, in FIG. 10(a), the four corners of the hollow portion that has a substantially rectangular shape are configured in a curved shape. By configuring the four corners to have the slightly curved lines, instead of the right angle, it is possible to improve the strength of the electrical lines in the four corners. However, if R excessively increases, the rectangular coil is almost equal to the circular coil, so that it is not possible to obtain an effect that can be obtained only in the rectangular coil. As a result of examination, when the side width y1 of the hollow portion is 20 mm, if the radius R of the curved line of each corner is 6 mm or less, an influence of the magnet can be effectively suppressed. As described above, if the strength of the four corners is considered, the radius R of the curved line of each corner is 5 to 30% of the side width of the hollow portion having the substantially rectangular shape, so that it is possible to obtain an effect of the above rectangular coil.

Furthermore, a relation of the magnet and the hollow portion of the coil wound in a rectangular shape of the non-contact charging module will be described.

Figure 11:
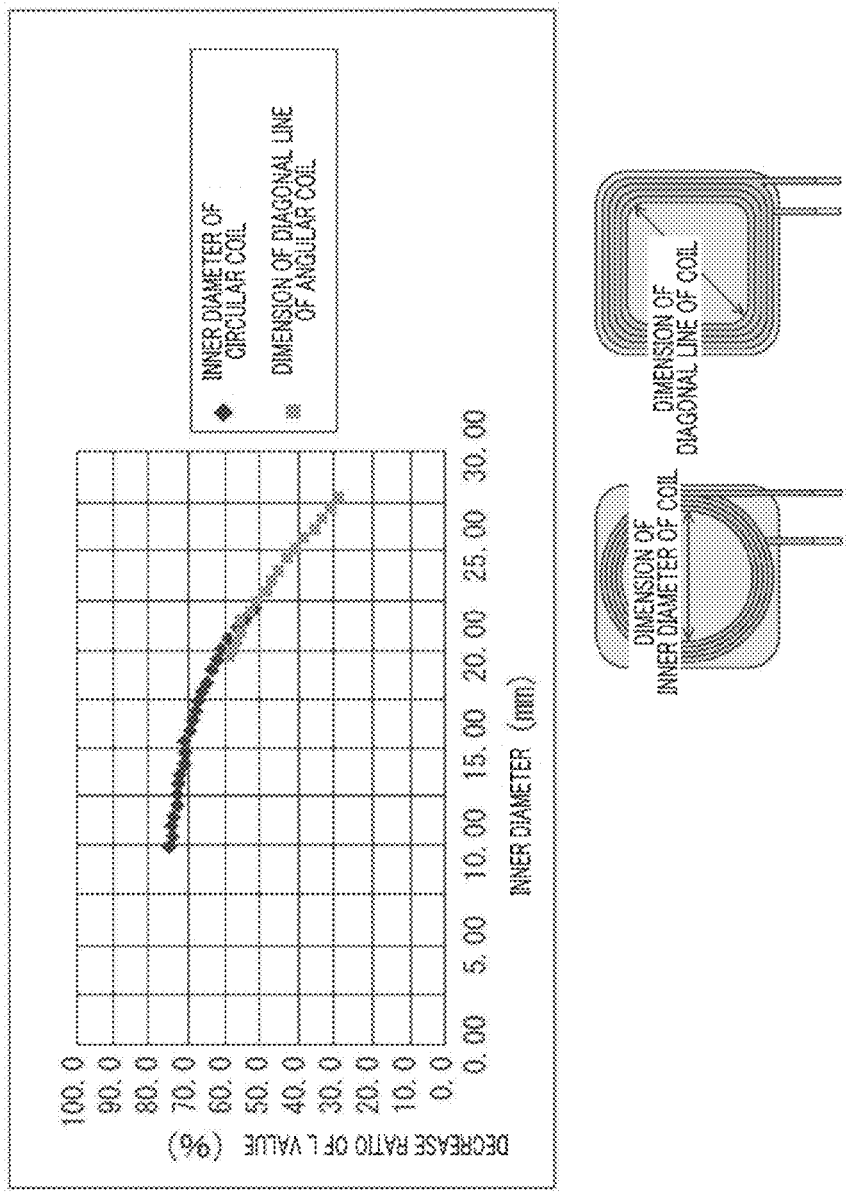
FIG. 11 is a diagram illustrating a decrease ratio of the L value of the planar coil portion in the case where the magnet is included with respect to the case where the magnet is not included, when changing a dimension of a diagonal line of the inner side of a rectangular planar coil portion and a dimension of the inner diameter of a circular planar coil portion in FIG. 10.

FIG. 11 illustrates a decrease ratio of the L value of planar coil portion in the case where aligning magnet 30a is included with respect to the case where aligning magnet 30a is not included, when a dimension of a diagonal line of the inner side of the rectangular planar coil portion of FIG. 10 and an inner diameter dimension of a circular planar coil portion change (the size of magnetic sheet 4 is changed according to the dimension). That is, FIG. 11 illustrates a state in which an influence of the aligning magnet decreases as the decrease ratio of the L value decreases. In the present embodiment, the reception-side non-contact charging module is described as an example. However, it is obvious that the description of the reception-side non-contact charging module can be applied to the transmission-side non-contact charging module.

As illustrated in FIG. 11, as an internal dimension of the coil increases, the decrease ratio of the L value of the planar coil portion decreases. This is because the area where the interval of aligning magnet 30a and the inner side of the planar coil portion is sufficiently taken increases and an influence of aligning magnet 30a decreases. Meanwhile, when the dimension of the diagonal line of the inner side of the rectangular planar coil portion and the dimension of the inner diameter of the circular planar coil portion have the same value, the decrease ratio of the L value of the planar coil portion has the same value.

That is, if the dimension x of the diagonal line of the inner side of the rectangular planar coil portion and the dimension y of the inner diameter of the circular planar coil portion are larger than the diameter in of the aligning magnet (x=y>m), a gap can be generated between the inner side of the planar coil portion and the outer diameter of the aligning magnet. However, in this case, the area of a plane of the planar coil portion in the rectangular planar coil portion is narrower than that in the circular planar coil portion. Therefore, the dimension of the diagonal line of the inner side of the rectangular planar coil portion can be increased so as to match the size of magnetic sheet 4. In this way, in the case where the planar coil portion is disposed in magnetic sheet 4, as compared with the circular planar coil portion, the gap can be generated between the inner side of the planar coil portion and the outer side of the aligning magnet, so that it is possible to decrease an influence of the aligning magnet in the rectangular planar coil portion. In the present embodiment, in order to satisfy the above-described relation, the dimension x of the diagonal line of the rectangular planar coil portion is set to about 23 mm and the diameter m of aligning magnet 4 is set to 15 mmϕ.

Figure 12B:
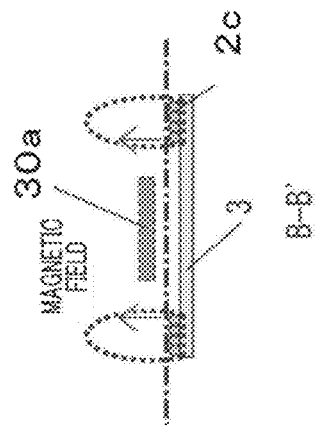
FIG. 12 is a diagram illustrating the magnitude of the magnetic field that is generated by the rectangular planar coil portion.
Figure 12A:
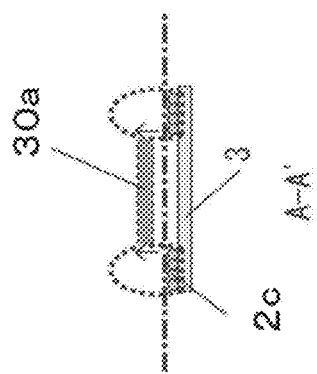
Figure 12C:
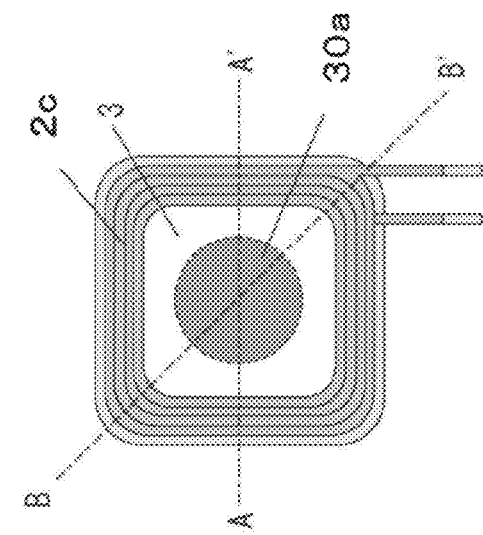

Next, the magnitude of the magnetic field that is generated in the rectangular planar coil portion will be described using FIG. 12. FIG. 12(b) is a cross-sectional view taken along the line A-A' of FIG. 12(a), and FIG. 12(c) is a cross-sectional view taken along the line B-B' of FIG. 12(a). In FIG. 12(b), the end of the aligning magnet and the inner end of the rectangular planar coil portion become close to each other, and the magnetic field that is generated in the rectangular planar coil portion is decreased by the influence of the magnetic field of the aligning magnet. Meanwhile, in FIG. 12(*c*), the end of the aligning magnet and the inner end of the rectangular planar coil portion are apart from each other, it becomes difficult to receive the influence of the magnetic field of the aligning magnet, and then the magnetic field that is generated in the rectangular planar coil portion increases. That is to say, in the circular planar coil portion, in any place of the circumference of the coil, the magnetic field that is generated in the circular planar coil portion is small, that is, the L value of the circular planar coil portion is low, the L value affecting mutual inductance of electromagnetic induction, so that the power transmission efficiency of the non-contact charging module decreases. Meanwhile, in the above rectangular planar coil portion, the generated magnetic field increases, that is, the L value of the rectangular planar coil portion that affects the mutual inductance of the electromagnetic induction becomes larger than the L value of the circular planar coil portion, so that power transmission efficiency of the non-contact charging module when the rectangular planar coil portion is used becomes superior to power transmission efficiency when the circular planar coil portion is used.

Next, a result that is obtained by measuring the L value of the planar coil portion by changing the ferrite thickness of magnetic sheet 4 in the rectangular planar coil portion and the circular planar coil portion in FIG. 10 will be described.

Figure 13:
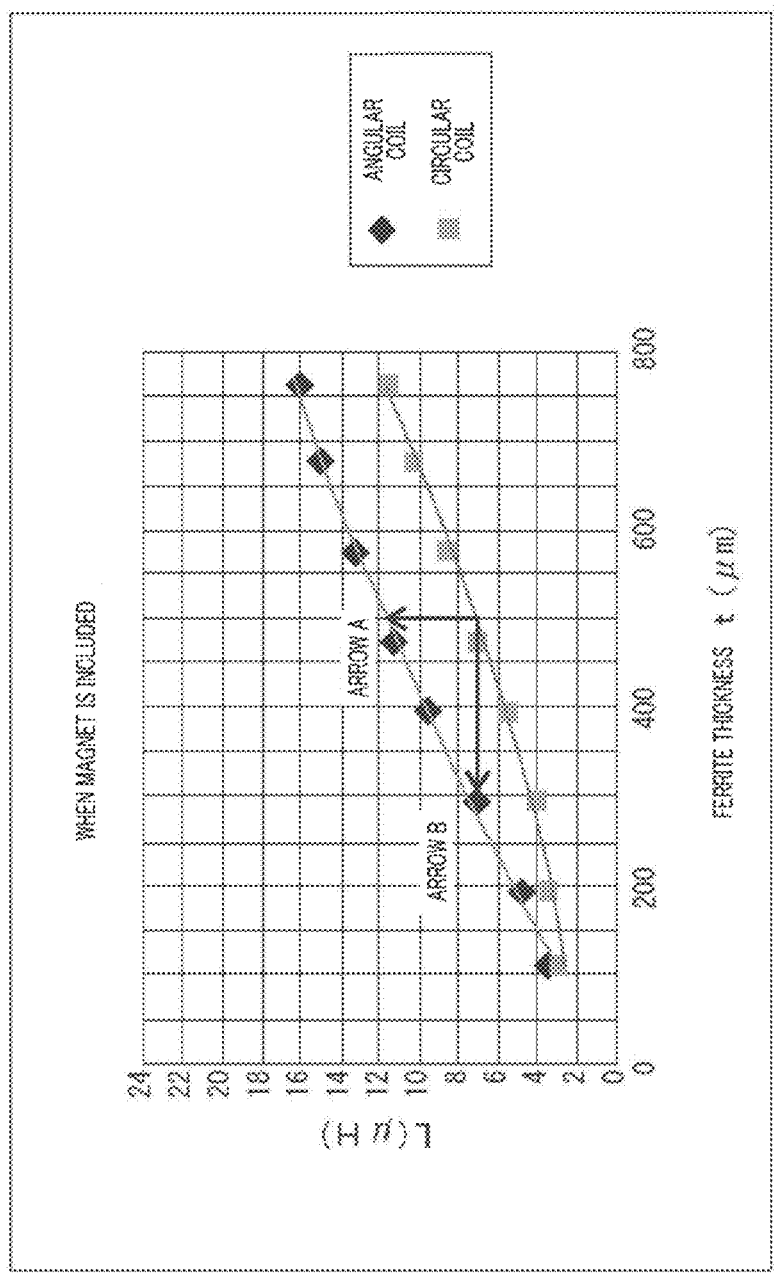
FIG. 13 is a diagram illustrating a result that is obtained by measuring the L value of the planar coil portion by changing the thickness of a magnetic sheet according to the present embodiment.

FIG. 13 illustrates a result that is obtained by measuring the L value of the planar coil portion by changing the ferrite thickness of magnetic sheet 4. In this case, the L value is an inductance value of the planar coil portion, and power transmission efficiency of the non-contact charging module becomes high as the L value increases.

In order to satisfy power transmission performance of the non-contact charging module, the L value of the coil needs to be 6 to 8 μH. However, when the aligning magnet is provided, an effect of increasing the strength of the magnetic field of magnetic sheet 4 decreases due to the influence of the aligning magnet.

According to FIG. 13, when the aligning magnet is provided, the ferrite thickness of magnetic sheet 4 needs to be 500 μm in order for the circular planar coil portion to generate the L value of the coil of 6 to 8 μH. As compared with the circular planar coil portion, the L value of the rectangular planar coil portion that has the same ferrite thickness becomes 12 μH (refer to the arrow A).

Under the condition in which the ferrite thickness and the area of magnetic sheet 4 are equal to each other, the L value of the rectangular planar coil portion becomes larger than the L value of the circular planar coil portion. Therefore, the magnetic field that is generated by the rectangular planar coil portion increases and power transmission efficiency of the non-contact charging module increases.

When the L value of the rectangular planar coil portion and the L value of the circular planar coil portion are set to the same value, the ferrite thickness of magnetic sheet 4 can be set to a small value in the rectangular planar coil portion. That is, if the L value is set to 6 to 8 μH as a target value, the ferrite thickness of magnetic sheet 4 of the rectangular planar coil portion can be set to 300 μm (refer to the arrow B) and the ferrite thickness can be made thinner. Therefore, it is possible to reduce the thickness of the non-contact charging module, so that the small size can be easily achieved.

As such, the influence of the magnetic field of the aligning magnet can be prevented by configuring the planar coil used by the non-contact charging module in a rectangular shape and the size of the non-contact charging module can be decreased by improving power transmission efficiency of the non-contact charging module.

The wounding of the coil is not limited to in a rectangular shape and may be in a square shape or a polygonal shape having R at the corners. That is, the shape of the coil may be a shape in which the entire coil is disposed on magnetic sheet 4 and a portion where the inner edge of the coil is apart from the outer edge of the aligning magnet increases. In particular, with the rectangular shape, the above-described effect can be obtained and the rectangular coil can be easily formed.

In the present embodiment, the coil of the rectangular planar coil portion is described to be wound in a square shape. However, the shape of the coil is not limited to in a square shape and may be in a rectangular shape. That is, if at least a part of the four inner sides of the coil is closer to the outer side than the outer circumference of the aligning magnet, the above-described effect can be obtained.

The aligning magnet does not need to be disposed in both the transmission-side non-contact charging module and the reception-side non-contact charging module and may be disposed on one side. In the present embodiment, the case where the aligning magnet is in the non-contact charging module to be the counterpart side rather than in the non-contact charging module has been described. However, the description of the above case can be applied to the case where the aligning magnet is installed in the non-contact charging module not to be the counterpart side.

The minimum dimension of the diagonal line of the rectangular coil (which is also called angular coil) of FIG. 11 is about 19 mm. When the dimension of the diagonal line is 19 mm, the distance of the facing sides of the hollow portion of the inner side of the rectangular coil is about 13.5 mm. Therefore, in FIG. 11, when the dimension of the diagonal line of the rectangular coil is 19 mm, the aligning magnet having the diameter of 15.5 mm and the hollow portion of the inner side of the rectangular coil are covered. That is, if the size of the hollow portion of the inner side of the rectangular planar coil portion is larger than the size of the aligning magnet, it is possible to decrease the decrease ratio of the L value.

As described above, an influence of the magnet in the rectangular coil is smaller than an influence of the magnet in the circular coil. However, if both the primary-side coil and the secondary-side coil are rectangular coils, the corners need to be aligned when charging and aligning are performed. Therefore, since angular adjustment at the time of aligning is difficult, one coil may be a circular coil and the other coil may be a rectangular coil. That is, the angle adjustment does not need to be performed and the rectangular coil can suppress an influence of the magnet. In addition, one of the primary-side non-contact charging module and the secondary-side non-contact charging module may include a rectangular coil and the other may include the circular coil. However, since the circular coil can perform efficient power transmission regardless of a shape of the coil which is the counterpart of power transmission, the primary-side non-contact charging module may include the circular coil.

As described above, in the present invention, the non-contact charging module where the size of the hollow portion of the inner side of the planar coil portion is larger than the size of the magnet is configured. At this time, if the size of the hollow portion of the inner side of the planar coil portion is more than the size of the magnet, this means that the magnet included in the transmission-side non-contact charging module (other non-contact charging module) does not overlap the hollow portion of the planar coil portion of the reception-side non-contact charging module, when the transmission-side non-contact charging module and the reception-side non-contact charging module are aligned. That is, this means that the magnet included in the transmission-side non-contact charging module does not protrude to the coil surface from the hollow portion of the reception-side non-contact charging module and is stored in the hollow portion, when the transmission-side non-contact charging module and the reception-side non-contact charging module are viewed from the upper side.

INDUSTRIAL APPLICABILITY

According to the transmission-side non-contact charging module and the non-contact charging apparatus using the same according to the present invention, the change of the L value of the coil that is provided in the non-contact charging module can be suppressed in both of the case where the magnet of the counterpart-side non-contact charging module is used in aligning of the primary-side non-contact charging module and the secondary-side non-contact charging module and the case where the magnet is not used. Therefore, the transmission-side non-contact charging module and the non-contact charging apparatus can be used in both of the case where the magnet is used and the case where the magnet is not used and can be used as a transmission-side charging apparatus when a portable terminal such as a mobile phone, a portable audio device, and a portable computer and a portable apparatus such as a digital camera and a video camera are charged.

REFERENCE SIGNS LIST

1 Primary-side non-contact charging module
2 Secondary-side non-contact charging module
3 Magnetic sheet (primary side)
4 Magnetic sheet (secondary side)
11a Primary-side coil
11b Secondary-side coil
22a, 23a Terminal (primary side)
22b, 23b Terminal (secondary side)
30a Magnet (primary side)
30b Magnet (secondary side)
31a Flat portion (primary side)
31b Flat portion (secondary side)
32a Center portion (primary side)
32b Center portion (secondary side)
33a Linear concave portion (primary side)
33b Linear concave portion (secondary side)
34a Slit (primary side)
34b Slit (secondary side)

The invention claimed is:

1. A non-contact charging module that performs power transmission by an electromagnetic induction with another non-contact charging module that comprises a first hole and that is allowed to align with the other non-contact charging module in either a first case or a second case, the first case being a case where a magnet included within the first hole in the other non-contact charging module is used when alignment with the other non-contact charging module is performed, the second case being a case where the magnet is not within the first hole and thereby not used when the alignment is performed, the non-contact charging module comprising:
a planar coil portion in which a conducting wire is wound in a substantially rectangular shape and that comprises a second hole of a predetermined size, the second hole being provided within an inner winding of the planar coil portion; and
a magnetic sheet on which a coil surface of the planar coil portion is placed and that faces the coil surface of the planar coil portion, wherein
a length of a shortest distance between opposed inner sides of a substantially rectangular hollow portion of the planar coil portion is longer than a diameter of the magnet, and
the predetermined size of the second hole is greater than 15.5 mm.

2. The non-contact charging module according to claim 1, wherein a shape of the magnetic sheet is substantially rectangular and the magnetic sheet has a concave portion or slit that extends toward an edge of the magnetic sheet.

3. A non-contact charging module apparatus using the non-contact charging module according to claim 1 as at least one of a power transmission module or a power reception module.

4. The non-contact charging module according to claim 1, further comprising an alignment magnet, wherein the alignment magnet couples to the magnet included in the other non-contact charging module and the alignment magnet is used to align the non-contact charging module with the other non-contact charging module.

5. The non-contact charging module according to claim 4, wherein a first area of the first hole is greater than a second area of the alignment magnet.

6. The transmission-side non-contact charging module according to claim 5, wherein a first area of the first hole is greater than a second area of the alignment magnet.

7. The non-contact charging module according to claim 1, further comprising an alignment module, wherein the alignment module comprises an alignment unit to structurally align the non-contact charging module with the other non-contact charging module.

8. The non-contact charging module according to claim 1, wherein the planar coil portion further comprises a coil surface and the magnetic sheet is coupled opposite to the coil surface.

9. The non-contact charging module according to claim 8, wherein the magnetic sheet touches the coil surface.

10. The non-contact charging module according to claim 1, wherein the substantially rectangular hollow portion is formed at an inner position corresponding to the inner winding of the planar coil portion.

11. The noncontact charging module according to claim 1, wherein a first area of the second hole is greater than a second area of the magnet.

12. A transmission-side non-contact charging module that transmits power to a reception-side non-contact charging module that comprises a first hole by an electromagnetic induction and that is allowed to align with the reception-side non-contact charging module in either a first case or a second case, the first case being a case where a magnet included within the first hole in the reception-side non-contact charging module is used when alignment with the reception-side non-contact charging module is performed, the second case being a case where the magnet is not within the first hole and thereby not used when the alignment is performed, the transmission-side non-contact charging module comprising:
a planar coil portion in which a conducting wire is wound and that comprises a second hole of a predetermined size, the second hole being provided within an inner winding of the planar coil portion; and
a ferrite sheet on which a coil surface of the planar coil portion is placed and that faces the coil surface of the planar coil portion and that attracts, in the case where the magnet is used when the alignment with the reception-side non-contact charging module is performed, the magnet of the reception-side non-contact charging module, wherein the predetermined size of the second hole is larger than a size of the magnet included in the reception-side non-contact charging module, and wherein the predetermined size of the second hole is greater than 15.5 mm.

13. The transmission-side non-contact charging module according to claim 12, wherein a distance between an edge of a hollow portion of the planar coil portion and an outer edge of the magnet is more than 0 mm and smaller than 6 mm.

14. The transmission-side non-contact charging module according to claim 12, wherein the planar coil portion is configured such that an area of the magnet becomes 80 to 95% of area of the inner winding of the planar coil portion, in a surface parallel to the planar coil portion.

15. A transmission-side non-contact charging apparatus comprising a transmission-side non-contact charging module according to claim 12, the transmission-side non-contact charging module comprising:
- a planar coil portion in which a conducting wire is wound in a spiral shape and comprises a second hole of a predetermined size, the second hole being provided within an inner winding of the planar coil portion;
- a terminal that supplies a current from an external power supply to the planar coil portion; and
- a magnetic sheet that places a coil surface of the planar coil portion and faces the coil surface of the planar coil portion, wherein the predetermined size of the second hole is at least equal to a size of the first hole in the reception-side non-contact charging module, and the predetermined size of the second hole is greater than 15.5 mm.

16. The transmission-side non-contact charging module according to claim 12, wherein the ferrite sheet is magnetically coupled to an alignment magnet of the reception-side non-contact charging module.

17. The transmission-side non-contact charging module according to claim 16, wherein the planar coil portion is configured such that an area of the alignment magnet becomes 80 to 95% of n area of the inner winding of the planar coil portion, in a surface parallel to the planar coil portion.

18. The transmission-side non-contact charging module according to claim 12, wherein the transmission-side non-contact charging module is structurally coupled to the reception-side non-contact charging module.

19. The transmission-side non-contact charging module according to claim 12, wherein a first area of the second hole is greater than a second area of the magnet.

20. A reception-side non-contact charging module that receives power from a transmission-side non-contact charging module that comprises a first hole by an electromagnetic induction and that is allowed to align with the transmission-side non-contact charging module in either a first case or a second case, the first case being a case where a magnet included within the first hole in the transmission-side non-contact charging module is used when alignment with the transmission-side non-contact charging module is performed, the second case being a case where the magnet is not within the first hole and thereby not used when the alignment is performed, the reception-side contact charging module comprising:
- a planar coil portion in which a conducting wire is wound in a spiral shape and comprises a second hole of a predetermined size, the second hole being provided within an inner winding of the planar coil portion; and
- a magnetic sheet on which a coil surface of the planar coil portion is placed and that faces the coil surface of the planar coil portion and that attracts, in the case where the magnet is used when the alignment with the transmission-side non-contact charging module is performed, the magnet of the transmission-side non-contact charging module, wherein an inner diameter of the planar coil portion is larger than the magnet included in the transmission-side non-contact charging module, and the predetermined size of the second hole is greater than 15.5 mm.

21. The reception-side non-contact charging module according to claim 20, wherein a distance between an edge of the inner diameter of the planar coil portion and an outer edge of the magnet is more than 0 mm and smaller than 6 mm.

22. The reception-side non-contact charging module according to claim 20, wherein the planar coil portion is configured such that an area of the magnet becomes 80 to 95% of area of the inner winding of the planar coil portion, in a surface parallel to the planar coil portion.

23. A reception-side non-contact charging apparatus, comprising the reception-side non-contact charging module according to claim 20, that receives power from a transmission-side non-contact charging apparatus comprising the transmission-side non-contact charging module.

24. The reception-side non-contact charging module according to claim 20, further comprising an alignment magnet, wherein the alignment magnet couples to the magnet included in the transmission-side non-contact charging module and the alignment magnet is used to align the reception-side non-contact charging module with the transmission-side non-contact charging module.

25. The reception-side non-contact charging module according to claim 24, wherein a first area of the first hole is greater than a second area of the alignment magnet.

26. The reception-side non-contact charging module according to claim 24, wherein the planar coil portion is configured such that an area of the alignment magnet becomes 80 to 95% of an area of the inner winding of the planar coil portion, in a surface parallel to the planar coil portion.

27. The reception-side non-contact charging module according to claim 24, wherein the alignment magnet has a circular shape and a diameter of the alignment magnet is 15.5 mm.

28. The reception-side non-contact charging module according to claim 20, further comprising an alignment module, wherein the alignment module comprises an alignment unit to structurally align the reception-side non-contact charging module with the transmission-side non-contact charging module.

29. The reception-side non-contact charging module according to claim 20, wherein a first area of the second hole is greater than a second area of the magnet.

30. A non-contact charging module that performs power transmission by an electromagnetic induction with another non-contact charging module that comprises a first hole and that is allowed to align with the other non-contact charging module in either a first case or a second case, the first case being a case where a magnet included within the first hole in the other non-contact charging module is used when alignment with the other non-contact charging module is performed, the second case being a case where the magnet is not within the first hole and thereby not used when the alignment is performed, the non-contact charging module comprising:
- a planar coil portion in which a conducting wire is wound in a substantially rectangular shape and that comprises a second hole of a predetermined size, the second hole being provided within an inner winding of the planar coil portion; and a magnetic sheet on which a coil surface of the planar coil portion is placed and that faces the coil surface of the planar coil portion, wherein the predetermined size of the second hole is at least equal to a size of the first hole, and the predetermined size of the second hole is greater than 15.5 mm.

31. A reception-side non-contact charging module that receives power from a transmission-side non-contact charging module that comprises a first hole by an electromagnetic induction and that is allowed to align with the transmission-side non-contact charging module in either a first case or a second case, the first case being a case where a magnet included within the first hole in the transmission-side non-contact charging module is used when alignment with the transmission-side non-contact charging module is performed, the second case being a case where the magnet is not within the first hole and thereby not used when the alignment is performed, the reception-side contact charging module comprising:

a planar coil portion in which a conducting wire is wound in a spiral shape and comprises a second hole of a predetermined size, the second hole being provided within an inner winding of the planar coil portion; and a magnetic sheet on which a coil surface of the planar coil portion is placed and that faces the coil surface of the planar coil portion and that attracts, in the case where the magnet is used when the alignment with the transmission-side non-contact charging module is performed, the magnet of the transmission-side non-contact charging module, wherein the predetermined size of the second hole is at least equal to a size of the first hole, and the predetermined size of the second hole is greater than 15.5 mm.

* * * * *